US007072340B2

(12) United States Patent
Agrawal et al.

(10) Patent No.: US 7,072,340 B2
(45) Date of Patent: Jul. 4, 2006

(54) DYNAMIC ASSIGNMENT AND VALIDATION OF IP ADDRESSES IN WIRELESS IP NETWORKS

(75) Inventors: Prathima Agrawal, New Providence, NJ (US); Jyh-Cheng Chen, Hsinchu (TW); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 1018 days.

(21) Appl. No.: 10/062,593

(22) Filed: Jan. 31, 2002

(65) Prior Publication Data

US 2003/0142642 A1 Jul. 31, 2003

(51) Int. Cl.
*H04L 12/28* (2006.01)
(52) U.S. Cl. .................. 370/392; 370/401; 709/203
(58) Field of Classification Search .................. None
See application file for complete search history.

(56) References Cited

U.S. PATENT DOCUMENTS

| | | | |
|---|---|---|---|
| 6,212,563 B1 * | 4/2001 | Beser .................. | 709/227 |
| 6,466,986 B1 * | 10/2002 | Sawyer et al. .......... | 709/245 |
| 6,952,428 B1 * | 10/2005 | Necka et al. ........... | 370/466 |
| 2001/0023459 A1 * | 9/2001 | Asami .................. | 709/245 |
| 2002/0076054 A1 * | 6/2002 | Fukutomi et al. ....... | 380/277 |

OTHER PUBLICATIONS

R. Droms, "RFC 2131: Dynamic Host Configuration Protocol", Mar. 1997, IETF, pp. 1-45.*

* cited by examiner

*Primary Examiner*—Chau Nguyen
*Assistant Examiner*—Jung Park
(74) *Attorney, Agent, or Firm*—Joseph Giordano; James W. Falk

(57) ABSTRACT

The transmission of unnecessary assignment and validation information to mobile terminals in wireless IP networks is automatically blocked. Assignment and validation information originating with a mobile terminal is discarded by a base station if the information is not directly received by the base station from a mobile terminal. Assignment and validation information originating with an IP address server is broadcast only to those mobile terminals awaiting assignment or validation information using a local broadcast IP address. The validation and assignment is automatically begun once a mobile terminal enters a new subnet by resetting the mobile terminal's IP address to the broadcast address for assignment and validation requests and then broadcasting validation and, if necessary, assignment requests to the wireless IP network.

23 Claims, 14 Drawing Sheets

DYNAMIC ASSIGNMENT AND VALIDATION OF IP ADDRESSES IN WIRELESS IP NETWORKS

FIELD OF THE INVENTION

The present invention generally relates to wireless Internet Protocol (IP) communication networks. More specifically, this invention relates to the assignment and validation of Internet Protocol addresses (IP addresses) for mobile terminals within wireless IP networks.

BACKGROUND OF THE INVENTION

Many innovative technologies have been developed in the recent telecommunications revolution, the most important of which undoubtedly include the creation of the Internet and the development of wireless communication systems. The Internet and other IP-based networks have enabled virtually instantaneous communication between millions of individuals across the globe. Wireless communication systems, and wireless mobile systems in particular, have allowed individuals to communicate while roaming over large distances in otherwise inaccessible regions, thereby making traditional home telephone service and wireline communication networks virtually obsolete in many situations.

The combination of the Internet and wireless communication technologies has resulted in the development of a number of popular products that enjoy both the accessability of the Internet and the convenience and mobility of wireless communication systems. It is not uncommon for typical cellular customers to use their cellular phone to connect to the Internet, surf the web, communicate with others using e-mail, upload and download news, files and information, and perform virtually every other Internet operation previously limited to personal computer users connected to the Internet via wireline systems. Such cellular phones and other similar wireless devices allow individuals to access the Internet when communicating through wireless IP-based networks, thereby providing tremendous convenience, power and flexibility.

Although the combination of the Internet and wireless communication technologies has been largely successful, there nonetheless remain some difficulties and problems associated with the merger of these previously independent technologies. In particular, the ability to assign and validate IP addresses remains a difficult problem for wireless network systems that employ Internet Protocol and similar IP-based protocols to communicate information.

Internet Protocol operates based on the assignment of a unique IP address to each individual network attachment point. An IP address represents both the identification and location of a particular terminal. Information is communicated between different users by specifying the information content, source IP address of the information sender, and destination IP address of the information recipient. The information content is then sent from the sender to the recipient based on the source and destination IP addresses specified with the information content. The address of the recipient is determined simply by examining the destination IP address, and the recipient is able to determine who the sender is and reply to the sender by examining the source IP address.

Although information is sent from the sender to the recipient, the information is rarely sent directly from the sender to the recipient. Instead, the information undergoes a process called routing, wherein the information is sent to a number of intermediate locations. A router at the intermediate location examines the source and destination IP addresses included with the information content to determine the next appropriate location to which to send the information. The information content itself is usually subdivided into smaller information pieces known as packets, and each packet includes its own source and destination IP address. Thus, each individual packet may be routed along distinct and independent routes to proceed from the sender to the recipient.

In order to send and receive information, each individual terminal must have an IP address. When a terminal connects to an IP network, it may often need to dynamically obtain an IP address. Dynamic IP address assignment, as well as general IP address management, occurs through dynamic IP address assignment protocols. For instance, the Dynamic Host Configuration Protocol (DHCP) and other similar protocols include a dynamic IP address assignment protocol that controls IP address allocation, including the assignment, distribution, maintenance and release of IP addresses for network hosts within an IP network.

When dynamic IP address assignment occurs under a protocol such as DHCP, the terminal requests an IP address from the IP network, and an IP address server within the IP network assigns the terminal an IP address from the pool of unassigned IP addresses that are available to the IP network. The user communicates with the IP network throughout the user's network session by using the assigned IP address. When the terminal disconnects from the IP network, the terminal releases this IP address, thereby making the IP address available for the IP network to assign to a new terminal. In this fashion, the IP network is able to reassign the same IP address to different users that connect to the IP network at different times.

In order for the terminal to cause an IP address server to assign an IP address to the terminal for use throughout a user's network session, the user broadcasts an IP address assignment request (assignment request) to a portion of the IP network, using a predetermined broadcast IP address as the destination IP address for the assignment request. This broadcast IP address is recognized by the IP network when routing the assignment request sent by the user. The broadcast of the assignment request sends the assignment request to all network hosts connected to the IP network, including all other users and IP address servers connected to that portion of the IP network. A major shortcoming of broadcasting address requests, address validation requests, and responses to these requests to every mobile is that they cause the mobiles to consume their power unnecessarily. Power on a mobile terminal is a scarce resource and should not be wasted unnecessarily.

As mentioned above, the IP address for each terminal in an IP network represents both the address and the location of that terminal within the IP network. In particular, individual users may be attached to different subnets of an IP network, which are simply smaller portions of an IP network. For each subnet, only certain IP addresses are valid for receiving IP packets from the subnet, because an IP address represents both location and identity. As a result, a user who is assigned an IP address is limited to only those subnets for which their IP address is valid.

When a terminal broadcasts an assignment request in a system where the IP network is divided into subnets, an IP address server within the terminal's subnet serves the assignment request, and the IP address server assigns the terminal an IP address that is valid within the terminal's current subnet. In this fashion, when an IP network is divided into subnets, an assignment request is not broadcast to the entire IP network, but is instead broadcast only within the terminal's particular subnet.

Traditionally, users in IP networks have been connected to an IP network via fixed or wireline connections, and therefore have not been able to migrate from one IP subnet to another. Thus, although a user's IP address represents the user's location or subnet within an IP network and limits the user to that location or subnet, this limitation traditionally has had little effect on IP-based communications. For instance, wireline and non-mobile Internet users are unable to migrate out of their particular subnet once they connect to an IP network; therefore, the user's IP address remains valid throughout their network session, and the user broadcasts only one assignment request and no validation requests per network session. With the advent of wireless IP networks, however, users are now able to migrate from one subnet to another, and this mobility significantly decreases the performance and efficiency of wireless IP networks through an increase in assignment and validation requests. In particular, if a user can migrate from one subnet to another, the user's IP address that was valid in the user's prior subnet may be invalid in the user's new subnet. However, the user may determine that the IP address from the former subnet is valid within the new subnet by broadcasting an IP address validation request (validation request) to an IP address server that serves the new subnet. Similar to an assignment request, a validation request is also traditionally broadcast to all network hosts within a subnet, and is therefore broadcast to all users and IP address servers connected to the new subnet.

Traditional wireless network systems employ known communication techniques including TDMA and CDMA (e.g., cdma2000 or W-CDMA) to communicate information between a mobile terminal and the wireless network. The wireless network itself includes a plurality of base stations that are connected as a network by traditional network connection means (e.g., Ethernet), and the wireless network may also be connected to other wireless or wireline networks, as well as subdivided into smaller wireless network subnets. Base stations communicate with mobile terminals connected to the wireless network by transmitting information to the mobile terminals and receiving information from the mobile terminals over radio channels. Similarly, mobile terminals connected to the wireless network communicate with base stations by transmitting information to the base stations and receiving information from the base stations over radio channels.

Wireless IP networks operate in a similar fashion to traditional wireless networks, but they employ Internet Protocol to communicate information between the wireless IP network and mobile terminals. Thus, mobile terminals that employ Internet Protocol to communicate information are able to communicate with a wireless IP network. Such mobile terminals include any wireless device that communicates information using Internet Protocol or similar IP-based protocols, including mobile phones, Palm Pilots, pagers, personal media devices, personal computers with wireless IP-based access means, such as wireless Ethernet cards, and other similar devices. Base stations within the wireless IP network are themselves divided into subnets that include specific IP addresses, and these IP addresses form an address pool from which the subnet may allocate IP addresses to mobile terminals connected to the subnet.

When mobile terminals connect to the wireless IP network, they may need to dynamically acquire an IP address to communicate with the subnet as is required for traditional IP networks. Thus, upon establishing an initial non-IP-based communication link with the wireless IP network, a mobile terminal broadcasts an assignment request to the IP subnet for its particular wireless IP network connection. This assignment request is in turn broadcast to every network host within the mobile terminal's subnet, including IP address servers within the subnet, as well as all other mobile terminals within the subnet. After an IP address server receives the assignment request and assigns the mobile terminal a valid IP address, the mobile terminal will subsequently communicate with the IP network by unicasting messages only to the intended recipient using its own IP address which is valid for the subnet.

Similarly, when a mobile terminal migrates from its previous subnet to a new subnet, the mobile terminal must validate its IP address from the prior subnet as valid within the new subnet. Thus, the mobile terminal broadcasts a validation request to the new subnet, which is sent to all network hosts within the subnet including every other mobile terminal connected to the subnet. The validation request includes the IP address to be validated for the mobile terminal, and thus the validation request includes the IP address from the prior subnet. The destination IP address of the validation request is the broadcast IP address for the subnet. An IP address server that serves the subnet receives the broadcast validation request and responds by determining if the mobile terminal's former IP address from the prior subnet included in the validation request is valid within the new subnet. If the IP address from the former subnet is not valid, then the mobile terminal must request a valid IP address for the new subnet, as described above.

In the wireless IP network system described above, a number of problems are apparent in regard to traditional methods for assigning and validating IP addresses in wireless IP networks. First, each mobile terminal must broadcast an assignment request when initially connecting to a new IP subnet in the wireless IP network, and in particular, to the mobile terminal's subnet within the wireless IP network. As the assignment request is broadcast to every network host within the subnet including mobile terminals, base stations within the subnet unnecessarily transmit the assignment request to every mobile terminal within the subnet. Given the large number of mobile terminals that traditionally reside in a subnet, and the limited amount of wireless bandwidth for communications between mobile terminals and the wireless IP network, this broadcast of assignment requests to all mobile terminals reduces the amount of bandwidth available to communicate information, increases the latency of communications between mobile terminals and the wireless IP network, and causes an increase in transmissions and interference for mobile terminals and base stations. Also, the wireless broadcast of each assignment request to every mobile terminal reduces the number of mobile terminals the wireless IP network can support, causes the loss and non-delivery of IP data to base stations and mobile terminals, and may completely impair the wireless IP network due to loss of data and bandwidth. Even assuming a mere loss of bandwidth is the only tangible effect, there is still an increase in the cost to construct a wireless IP network because additional IP base stations are required to compensate for lost bandwidth and to communicate the same amount of information as if assignment requests were not being transmitted to mobile terminals.

A second problem is that mobile terminal validation requests are also broadcast to all mobile terminals within the IP subnet. Thus, even assuming that an IP address validation is broadcast by a mobile terminal and an IP address server verifies that the mobile terminal's current IP address is still valid, the validation request is nonetheless broadcast to every mobile terminal within the wireless IP network. Thus, validation requests further add to the information congestion, loss of bandwidth and increase of latency described above, along with the associated harmful side effects.

These problems are further aggravated by the fact that assignment and validation information returned by an IP address server is also broadcast to every mobile terminal when returning information to a requesting mobile terminal. Thus, the return broadcast by an IP address server is transmitted to every mobile terminal including those mobile terminals that have not requested assignment or validation information, and this return broadcast further diminishes the amount of wireless bandwidth available between the IP network base stations and mobile terminals.

In addition to the bandwidth reduction caused by assignment requests and validation requests, a third problem is that known protocols that accomplish dynamic IP address assignment, such as DHCP, do not notify a mobile terminal of when it should request a new IP address or validate its existing IP address. Thus, mobile terminals simply do not know when to request a new IP address or validate an IP address from a prior subnet when they migrate from one subnet to another. As a result, a mobile terminal may erroneously use an invalid IP address in a new subnet where the IP address is no longer valid, which will cause the mobile terminal to lose its ability to communicate with the wireless IP network.

SUMMARY OF THE INVENTION

These and other problems with the assignment and validation of IP addresses for wireless IP networks are addressed by the present invention, which is a method and system for dynamic assignment and validation of IP addresses in a wireless IP network. Although the present invention addresses the particular problems associated with the unnecessary broadcast of IP address assignment validation information as it relates to wireless IP networks and mobile terminals, it should be understood that the benefits of the present invention extend beyond wireless IP networks and mobile terminals, as the invention broadly addresses the general reduction of IP network traffic caused by the unnecessary broadcast of assignment and validation information to mobile terminals.

The present invention reduces unnecessary IP network traffic caused by the broadcast of assignment and validation information, and in particular the unnecessary wireless broadcast of assignment and validation information, by preventing communication of such information to those network devices that are unnecessary recipients of this information. The broadcast of this information, including assignment and validation requests by mobile terminals and response assignment and validation information from IP address servers, is limited to prevent unnecessary transmission of this information to mobile terminals that are known to not require this information. As implemented in wireless IP networks, the present invention prevents the communication of assignment and validation information from mobile terminals and IP address servers to other mobile terminals within the same subnet, except for those mobile terminals that are broadcasting assignment requests and validation requests. In other words, if a mobile terminal is not requesting an IP address or validating its current IP address, then that mobile terminal will not receive assignment or validation information. In this way, the present invention significantly decreases wireless IP network traffic by blocking the unnecessary transmission of assignment and validation information to mobile terminals.

The present invention blocks the transmission of assignment and validation information by performing terminal-to-server blocking and server-to-terminal blocking. For terminal-to-server blocking, the present invention blocks the transmission of assignment and validation requests that originate at a mobile terminal and are intended for receipt by an IP address server. For server-to-terminal blocking, the present invention blocks the transmission of assignment and validation information that originates with an IP address server and is intended for receipt by a mobile terminal that has requested the assignment or validation information.

For terminal-to-server blocking, the present invention examines the source IP address and destination IP address included in assignment and validation requests sent by mobile terminals and responded to by IP address servers. The present invention looks for a broadcast IP address that is associated with a mobile terminal that is either requesting a new IP address or validating its current IP address. Thus, the broadcast message with its broadcast IP address will either be for an assignment request or a validation request, and the present invention is able to block transmission of these requests to mobile terminals that are unnecessary recipients. In particular, each base station is able to identify broadcast messages received from a mobile terminal and, if the message is received via a wired interface to the base station, then the base station blocks transmission of the broadcast message by discarding the broadcast information instead of transmitting it to the base station's mobile terminals. If the broadcast message was received on a wireless interface, however, then the base station forwards the broadcast message to the wired IP network because the message was directly received from the requesting mobile terminal. Thus, each base station sends assignment and validation requests received directly from a mobile terminal to the wired IP network, but discards assignment and validation requests forwarded from other base stations, so as to block unnecessary transmissions of such requests to mobile terminals.

For server-to-terminal blocking, the present invention uses local broadcast IP addresses to transmit information from IP address servers to only those mobile terminals that are awaiting assignment or validation information. In particular, each base station includes its own local broadcast IP address that includes only those mobile terminals communicating with the base station that are awaiting assignment or validation information. An address mapping table which corresponds to each local broadcast IP address, maps those mobile terminals that receive messages addressed to each local broadcast IP address, and includes only those mobile terminals that are awaiting assignment or validation information from an IP address server. Thus, when IP address servers broadcast assignment or validation information back to the mobile terminals, each base station transmits the information to its mobile terminals by addressing the information to the base station's local broadcast IP address. The base station determines which base stations are included as recipients of messages addressed to the local broadcast IP address via the address mapping table corresponding to the local broadcast IP address. Thus, base stations transmit assignment or validation information to mobile terminals by broadcasting the information using their respective local broadcast IP addresses, thereby precluding transmission of server-to-terminal assignment and validation information to mobile terminals that are not awaiting assignment or validation information (and thereby have valid IP addresses).

By blocking the unnecessary transmission of assignment and validation information, the present invention significantly benefits wireless IP networks. First, the amount of unnecessary wireless network traffic transmitted to mobile terminals is reduced, thereby increasing the bandwidth to available mobile terminals. Second, the power necessary to communicate information is reduced due to the reduction of transmissions, and the amount of interference caused by unnecessary transmissions to mobile terminals is also decreased. Third, the latency and potential loss of data caused by unnecessary IP network traffic is significantly reduced. Finally, the additional cost necessary to provide bandwidth to compensate for the unnecessary transmissions is reduced.

In addition to these benefits to the base station network, the present invention does not require the modification of dynamic IP address assignment protocols. In particular, the only modifications necessary to implement the present invention in a wireless IP network take place at base stations within the wireless IP network. Thus, dynamic IP address assignment protocols essentially "plug in" to the wireless IP network without modification, and yet the present invention still blocks unnecessary transmission of assignment and validation information to mobile terminals.

Furthermore, the present invention is compatible with a plurality of IP network architectures because it only examines the IP header of information in order to block assignment and validation information. The present invention blocks transmission of information by examining the source and destination IP addresses for the information, and thereby only has to examine IP header information which is located at layer 3 according to the Internet Protocol model. In contrast, the actual physical layer for information transmission, such as whether information is communicated using TDMA, CDMA (e.g., cdma2000 or W-CDMA), or Ethernet is located at layer 2. Thus, the present invention is not limited to a single wireless IP architecture that includes only a single communication method, but is instead effective in both local area and wide area wireless IP networks that include a plurality of communication methods such as TDMA, CDMA, and Ethernet.

In addition to blocking terminal-to-server and server-to-terminal assignment and validation information, the present invention is also able to perform these functions automatically whenever a user migrates from one subnet to another. Thus, unlike known methods for assigning and validating IP address information in wireless IP networks, the present invention prevents a user, such as a mobile terminal, from inadvertently using an invalid IP address within a new subnet. The present invention accomplishes this automatic validation and assignment of IP addresses for new subnets through a mobility daemon included in the user's driver software. Here, the mobility daemon first resets the user's IP address to a null address (typically 0.0.0.0) whenever the user enters a new subnet. By resetting the user's IP address to 0.0.0.0, the present invention prevents the user from using the former IP address in the new subnet until that address is validated within the new IP subnet. This resetting is temporary, however, until the user validates the former IP address from the former subnet or is assigned a new and valid IP address for the new subnet. A mobile daemon is a background program that runs continuously for the purpose of handling periodic service requests from the mobile terminal.

After resetting the user's address to 0.0.0.0, the mobility daemon triggers the user to broadcast a validation request to the new subnet, thereby causing the new IP subnet to affirm or deny the validity of the user's IP address from the former subnet. The validation request sent to the new subnet includes the mobile terminal's former IP address, and thus the new subnet determines if the former IP address is valid within the new subnet. If the mobile terminal's former IP address remains valid, then the mobile terminal merely continues to use the former IP address in the new subnet; otherwise, the mobile terminal requests assignment of a new IP address from the subnet and is granted a new and valid IP address for the subnet. Once the mobile terminal has secured a valid IP address by validation or assignment, the present invention sets the mobile terminal's IP address from 0.0.0.0 to the validated or assigned IP address for the subnet, and the mobile terminal uses the valid IP address to communicate with the IP network.

As implemented in a mobile terminal for a wireless IP network, the mobility daemon prevents the mobile terminal from using an invalid IP address from a former subnet in a new subnet as the mobile terminal migrates through the wireless IP network. Thus, data communication between a mobile terminal and the wireless IP network is not impaired when a mobile terminal migrates from one subnet to another, and the mobile terminal is able to enjoy full mobility within the IP network without risking loss of its network session. In addition, the operation of the mobility daemon is automatic, and thus the wired network and its associated base stations do not have to include any special software or instructions to support the handoff of mobile terminals from one subnet to another.

It should be understood that embodiments of the present invention may include only terminal-to-server blocking, server-to-terminal blocking, or a mobility daemon, as well as a combination of these features of the present invention. For instance, one embodiment of the present invention may include only a mobility daemon without terminal-to-server or server-to-terminal blocking. For this embodiment, a mobile terminal would automatically broadcast assignment and validation requests when entering a new subnet, but would also receive unnecessary assignment and validation information. Similarly, other embodiments of the present invention may exclude a mobility daemon, but include terminal-to-server blocking and/or server-to-terminal blocking. For these embodiments, unnecessary assignment and validation information transmissions to a mobile terminal would be blocked even though a mobile terminal would not automatically broadcast validation or assignment requests when entering a new subnet.

As a result of these and other embodiments described above, the present invention includes a plurality of IP networks and mobile terminals that may independently benefit to varying degrees according to the present invention and its different embodiments. For instance, one mobile terminal with a mobility daemon and another without a mobility daemon may simultaneously communicate with a wireless IP network that includes server-to-terminal and/or terminal-to-server blocking. Both of these mobile terminals will enjoy the benefit of assignment and validation information blocking although one mobile terminal automatically validates and requests assignment of their IP address, whereas the other does not. Similarly, a mobile terminal with a mobility daemon may migrate from a subnet with terminal-to-server blocking and/or server-to-terminal blocking to a subnet without terminal-to-server blocking or server-to-terminal blocking. The mobile terminal will benefit from the mobility daemon in both networks although one network includes some form of assignment and validation information blocking whereas the other does not. So long as a mobile terminal includes a mobility daemon, or the IP network communicating with the mobile terminal includes terminal-to-server or server-to-terminal blocking, then the mobile terminal will benefit from the present invention. Thus, terminal-to-server blocking, server-to-terminal blocking and the mobility daemon provide both independent and collective benefits to mobile terminals according to the present invention.

BRIEF DESCRIPTION OF THE DRAWINGS

The foregoing and other features of the present invention will be more readily apparent from the following detailed description and drawings of illustrative embodiments of the invention in which.

Figure 1:
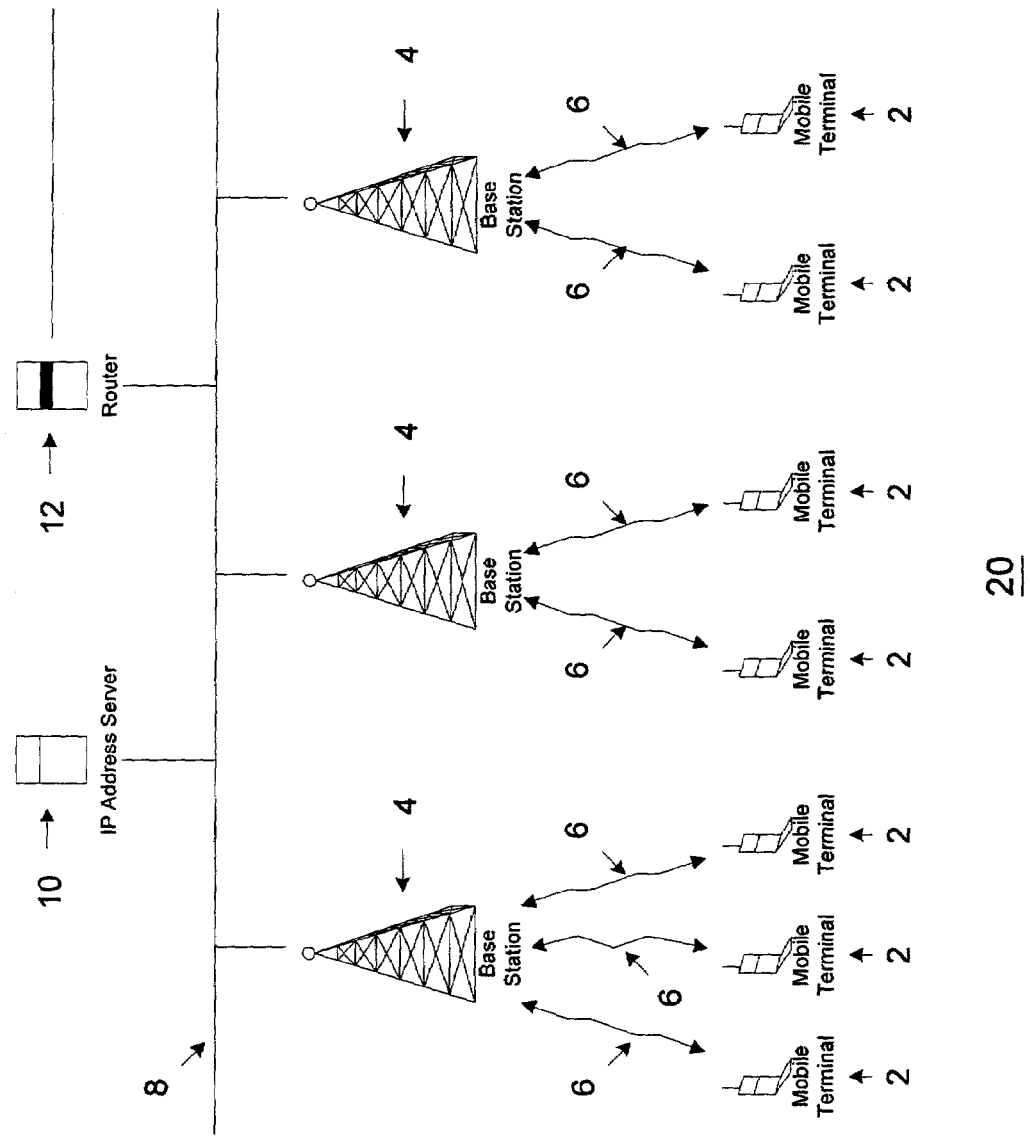
FIG. 1 is a block diagram illustrating a Wireless IP Network architecture.

DETAILED DESCRIPTION OF EXEMPLARY EMBODIMENTS:

FIG. 1 illustrates a Wireless IP Network architecture within which the present invention may be implemented. Referring to FIG. 1, therein is shown a wireless IP network 20, which includes a plurality of mobile terminals 2, base stations 4, wireless connections 6, wired connections 8, an IP address server 10 and a router 12. It should be understood that the wireless IP network 20 shown is representative of any wireless network that includes Internet Protocol to communicate information within the wireless IP network 20. Thus, the mobile terminals 2 are representative of any wireless device that communicates information using Internet Protocol or an IP-based protocol, including mobile phones, Palm Pilots, pagers, personal media devices, personal computers with wireless IP-based access means such as wireless Ethernet cards, and other similar devices. Similarly, the base stations 4 are representative of any transceiver capable of communicating with mobile terminals 2. In one embodiment of the present invention, the mobile terminals 2 are mobile cellular customers with IP-based cellular devices, and the base stations 4 are base stations within a wireless IP-based telecommunications network 20 that communicate with the mobile terminals 2.

The wireless connections 6 communicate information between the mobile terminals 2 and the base stations 4. Thus, information communicated by the base stations 4 through the wireless connections 6 is communicated through the wireless interfaces of the base stations 4. The base stations 4 are also connected to other base stations 4, the IP address server 10 and the router 12 through the wired connections 8. Thus, information communicated by the base stations 4 to other base stations 4, the IP address server 10 and the router 12 is communicated through wired interfaces of the base stations 4.

Figure 2:
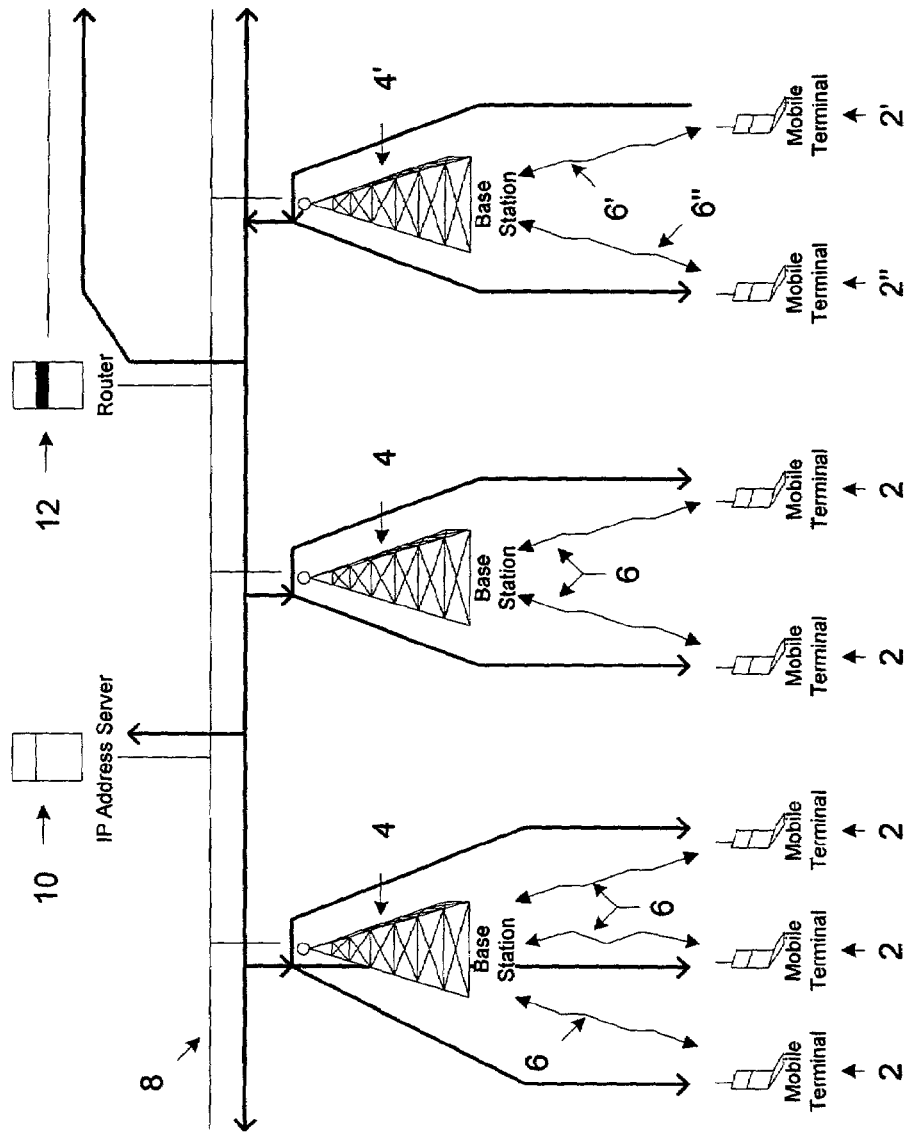
FIG. 2 is a block diagram illustrating Terminal-to-Server Assignment and Validation Congestion for a Wireless IP Network.

FIG. 2 illustrates Terminal-to-Server Assignment and Validation Congestion for a Wireless IP Network. This is the network congestion caused by the broadcast of assignment and validation information by mobile terminals to the wireless IP network, and in particular, the transmission of assignment and validation requests from mobile terminals to IP address servers.

As shown in FIG. 2, the mobile terminal 2' broadcasts an assignment or validation request to the rest of the wireless IP network 20. Mobile terminal 2' would broadcast a validation request if it had migrated to a new IP subnet from a former IP subnet, whereas it would broadcast an assignment request if the mobile terminal 2' had recently arrived in the IP subnet and its prior IP address was no longer valid, or if the mobile terminal 2' was a new mobile terminal without any prior IP address at all.

Mobile terminal 2' broadcasts its assignment or validation request to the wireless IP network 20 by transmitting the request to the base station 4' through the wireless connection 6'. The base station 4' receives the assignment or validation request and broadcasts it to the rest of the wireless IP network 20. Thus, the base station first transmits the assignment or validation request to the other base stations 4, IP address server 10 and router 12 within its IP subnet through the wired connections 8.

The IP address server 10 receives the assignment or validation request and is thereby able to respond to mobile terminal 2' by assigning the mobile terminal 2' a valid IP address, or by affirming or denying the validity of the IP address that mobile terminal 2' had in its prior IP subnet. In addition, the router 12 also receives the assignment or validation request and can forward it to another part of the wireless IP network if necessary to serve the request of mobile terminal 2'. Thus, both the IP address server 10 and the router 12 are necessary hosts that should and do receive the assignment or validation request from mobile terminal 2'.

Congestion occurs when the assignment or validation request from mobile terminal 2' is also transmitted to the other mobile terminals 2 and 2'' by the base stations 4 and 4'. In particular, the base stations 4 transmit the request from mobile terminal 2' to the other mobile terminals 2 through the wireless connections 6, and base station 4' transmits the request from the mobile terminal 2' to the mobile terminal 2'', thereby using up the bandwidth of the wireless IP network 20. The mobile terminals 2 and 2'' will neither serve the request by the mobile terminal 2' as does IP address server 10, nor will the mobile terminals 2 route the request by the mobile terminal 2' to another part of the wireless IP network 20, as does router 12. Thus, the mobile terminals 2 and 2" are unnecessary recipients of the assignment or validation request by mobile terminal 2', which causes congestion along the wireless connections 6 between the wireless IP network 20 and the mobile terminals 2.

Figure 3:
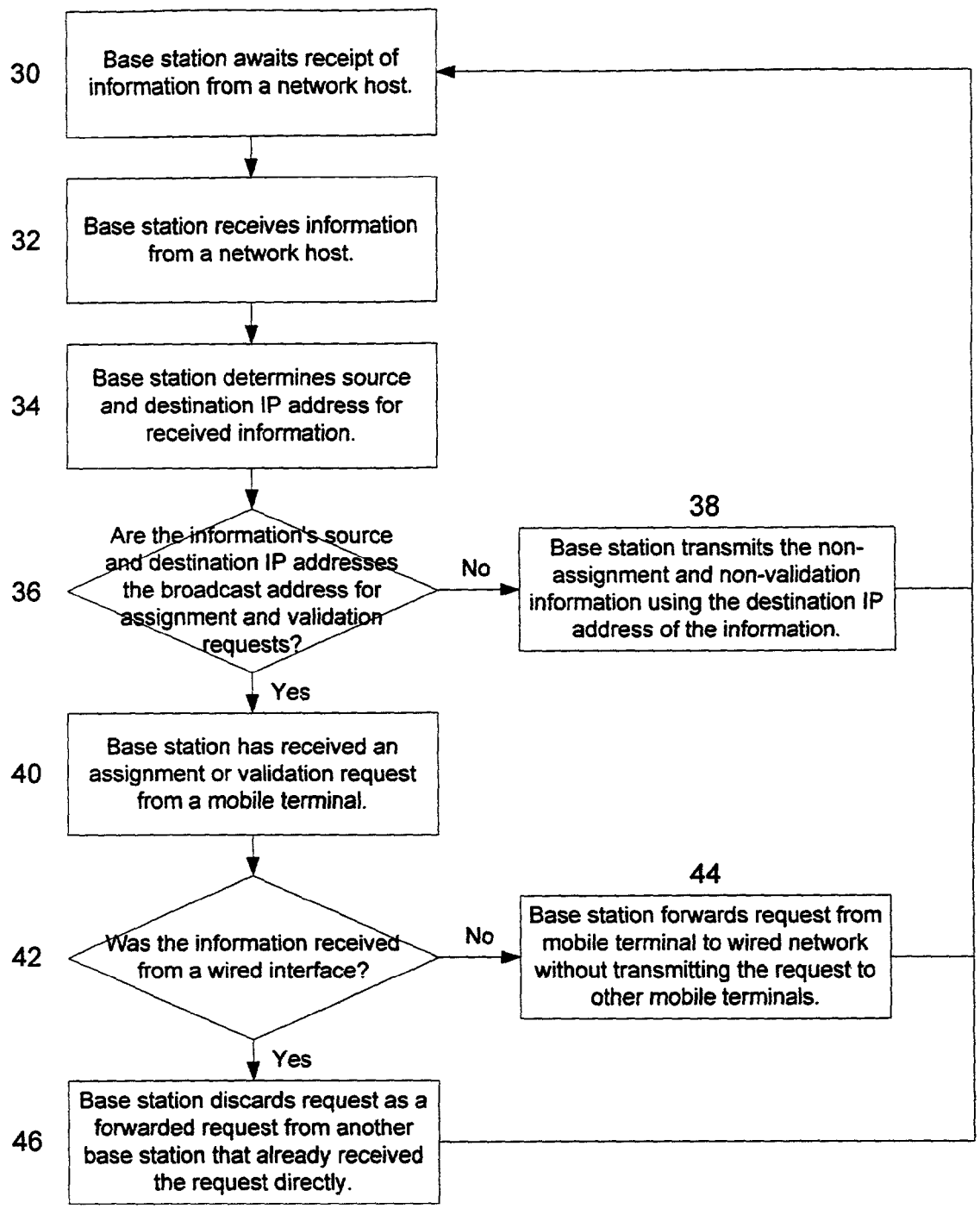
FIG. 3 is a flowchart of the Terminal-to-Server Blocking process in accordance with the illustrative embodiment of this invention.

FIG. 3 is a flowchart of the Terminal-to-Server Blocking process, wherein the terminal-to-server congestion shown in FIG. 2 is eliminated by the Terminal-to-Server Blocking process according to the present invention. The Terminal-to-Server Blocking process is implemented in each base station within the wireless IP network, and thus the base stations block assignment and validation requests that originate with a terminal and are intended for receipt by an IP address server.

Referring now to FIG. 3, a base station first waits for receipt of information from a network host in the form of IP data packets (step 30), and the base station eventually receives information from a network host (step 32). The base station examines the IP header field to determine the source IP address and the destination IP address for the received information (step 34), and then determines if the source IP address and destination IP address are the broadcast address for assignment requests and validation requests (step 36). If not, then the received information is not an assignment or validation request, and the process proceeds to step 38. If so, then the received information is an assignment or validation request, and the process proceeds to step 40.

At step 38, the base station has determined that the received information is not an assignment or validation request; thus, the base station transmits the information in the usual fashion according to the destination IP address, including to mobile terminals if appropriate. The process then returns to step 30, wherein the base station awaits receipt of additional information.

At step 40, the base station has determined that the received information is an assignment or validation request. Thus, the base station next determines if the request was received via a wireless interface or a wired interface (step 42). If the request was received from a wireless interface, then the base station must be receiving the request in the first instance, that is, directly from the mobile terminal that transmitted the request. Thus, the process proceeds to step 44, and the base station forwards the request to the wired network without transmitting to other mobile terminals, because transmitting to other mobile terminals would cause unnecessary wireless network congestion. The process then returns to step 30, wherein the mobile terminal awaits receipt of additional information.

Returning to step 40, if the assignment or validation request was received from a wired interface, then the base station must be receiving a forwarded request from another host within the wired network. Thus, the process proceeds to step 46, and the mobile terminal simply discards the request, because another base station has already received the request in the first instance and forwarded it to the wired network including the IP address server, and transmitting the request to other mobile terminals would cause unnecessary wireless network congestion. The process then returns to step 30, wherein the mobile terminal awaits receipt of additional information.

Figure 4:
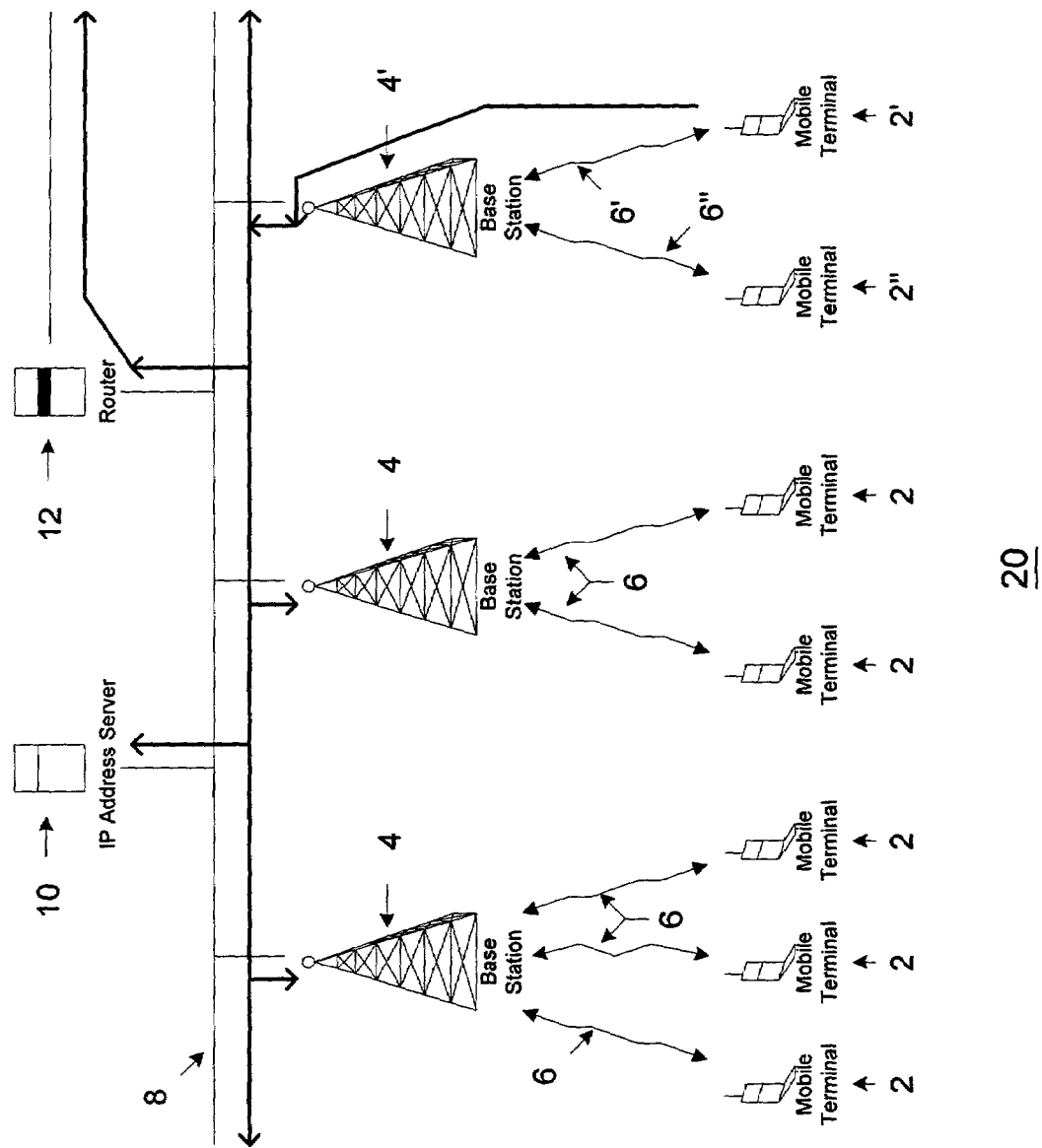
FIG. 4 is a block diagram illustrating a Wireless IP Network with Terminal-to-Server Blocking.

FIG. 4 represents a Wireless IP Network with Terminal-to-Server Blocking and which demonstrates the effect of the Terminal-to-Server Blocking process as implemented base stations of a wireless IP network, such as base stations 4 and 4' shown in FIG. 4. Referring now to FIG. 4, the mobile terminal 2' broadcasts an assignment or validation request which is transmitted to base station 4' through wireless connection 6'. Base station 4' receives the information from the mobile terminal 2', identifies the information as an assignment or validation request, and, as the base station of first receipt, forwards the request to the wired IP network. Thus, base station 4' forwards the request to wired network hosts including other base stations 4, the IP address server 10, and the router 12 through the wired connections 8. Having recognized that the received information is for an assignment or validation request, the base station 4' does not transmit the request to the mobile terminal 2'.

The IP address server 10 and router 12 both receive the assignment or validation request from the base station 4', and are thereby able to serve the request. Thus, the IP address server 10 may serve the request from the mobile terminal 2', or the request may be forwarded by the router 12 to another IP address server that serves the wireless IP network 20.

The base stations 4 also receive the assignment or validation request from the base station 4' and identify the information received as such from the broadcast address included as the source and destination IP address in the IP header information. The base stations 4 also determine that the request was received via the wired connections 8 and their associated wired interfaces. Thus, the base stations 4 discard the request and do not transmit it to the mobile terminals 2, because the base stations 4 identify the information received as an assignment or validation request forwarded by another base station and already broadcast to the wired network.

Figure 5:
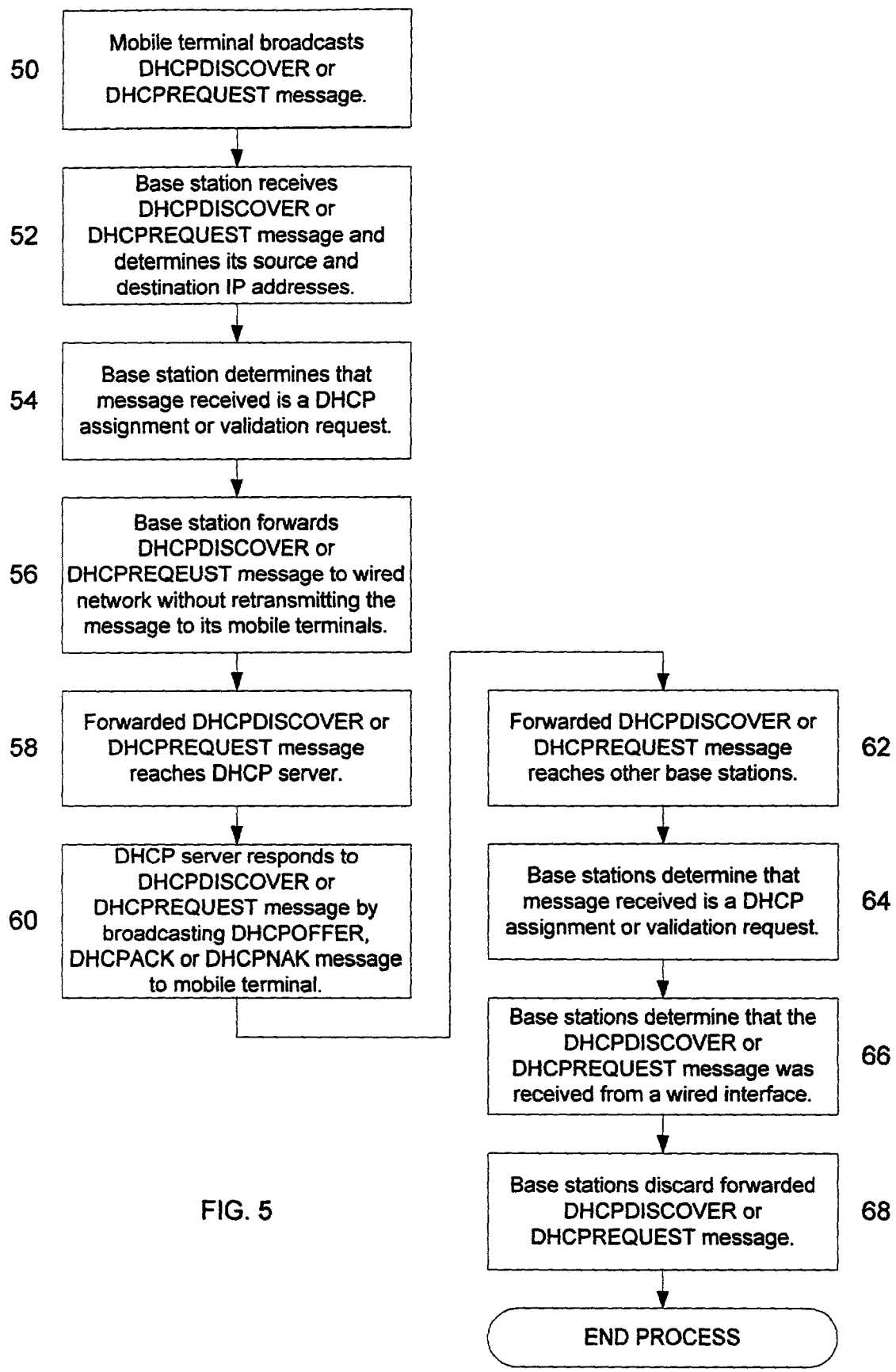
FIG. 5 is a flowchart of the DHCP Terminal-to-Server Blocking process.

FIG. 5 is a flowchart of the DHCP Terminal-to-Server Blocking process, which illustrates an implementation of the present invention using DHCP as the dynamic IP address assignment protocol. Thus, it is assumed the IP address servers that serve assignment and to validation requests are DHCP servers, and that the mobile terminals are clients of the DHCP servers that request assignment or validation information for IP addresses.

Referring now to FIG. 5, a mobile terminal first broadcasts a DHCPDISCOVER or DHCPREQUEST message to the wireless IP network (step 50). A DHCPDISCOVER message is broadcast by a DHCP client (here, the mobile terminal) when requesting a new IP address from a DHCP address server, whereas a DHCPREQUEST message is broadcast by a DHCP client when requesting validation of an IP address. Thus, the mobile terminal's broadcast of a DHCPDISCOVER or DHCPREQUEST message is equivalent to the broadcast of an assignment request or validation request, respectively, by the mobile terminal in DHCP.

A base station receives the DHCPDISCOVER or DHCPREQUEST message from the mobile terminal and examines its IP header information, including the source and destination IP addresses (step 52). The IP destination address will be the broadcast address, because this is the standard DHCP broadcast address. Thus, the base station determines that the information received is an assignment or validation request (step 54). The base station then forwards the DHCPDISCOVER or DHCPREQUEST message to the wired network without transmitting the message to other mobile terminals communicating with the base station (step 56).

The forwarded DHCPDISCOVER or DHCPREQUEST message eventually reaches a DHCP server either directly or through a router (step 58). A DHCP server is an IP address server that employs DHCP to control IP addressing of network hosts including mobile terminals. Thus, DHCP servers receive assignment and validation requests using DHCP and return assignment and validation information in DHCP. The DHCP server receives the DHCPDISCOVER or DHCPREQUEST message and assigns a new IP address to the requesting mobile terminal by broadcasting a DHCPOF- FER message to the mobile terminal, or validates the IP address of the requesting mobile terminal from a prior IP subnet by broadcasting a DHCPACK or DHCPNAK message to the mobile terminal (step 60). The broadcast message from the DHCP server to the mobile terminals also uses the broadcast address as the destination IP address, but the source IP address of the broadcast message is the source IP address of the DHCP server.

The forwarded DHCPDISCOVER or DHCPREQUEST message also eventually reaches other base stations that are part of the wired IP network (step 62). These recipient base stations determine that the DHCPDISCOVER or DHCPREQUEST message is an assignment or validation request by examining the IP header information and determining that the IP destination address is a broadcast address (step 64), as well as determining that the DHCPDISCOVER or DHCPREQUEST message was received from a wired interface and has thereby been forwarded from another base station within the wireless IP network (step 66). Thus, these base stations do not transmit the DCHPDISCOVER or DHCPREQUEST message to the other mobile terminals communicating with those base stations, but instead discard the DHCPDISCOVER or DHCPREQUEST message to prevent unnecessary transmission of the DHCPDISCOVER or DHCPREQUEST message to other mobile terminals (step 68).

Figure 6:
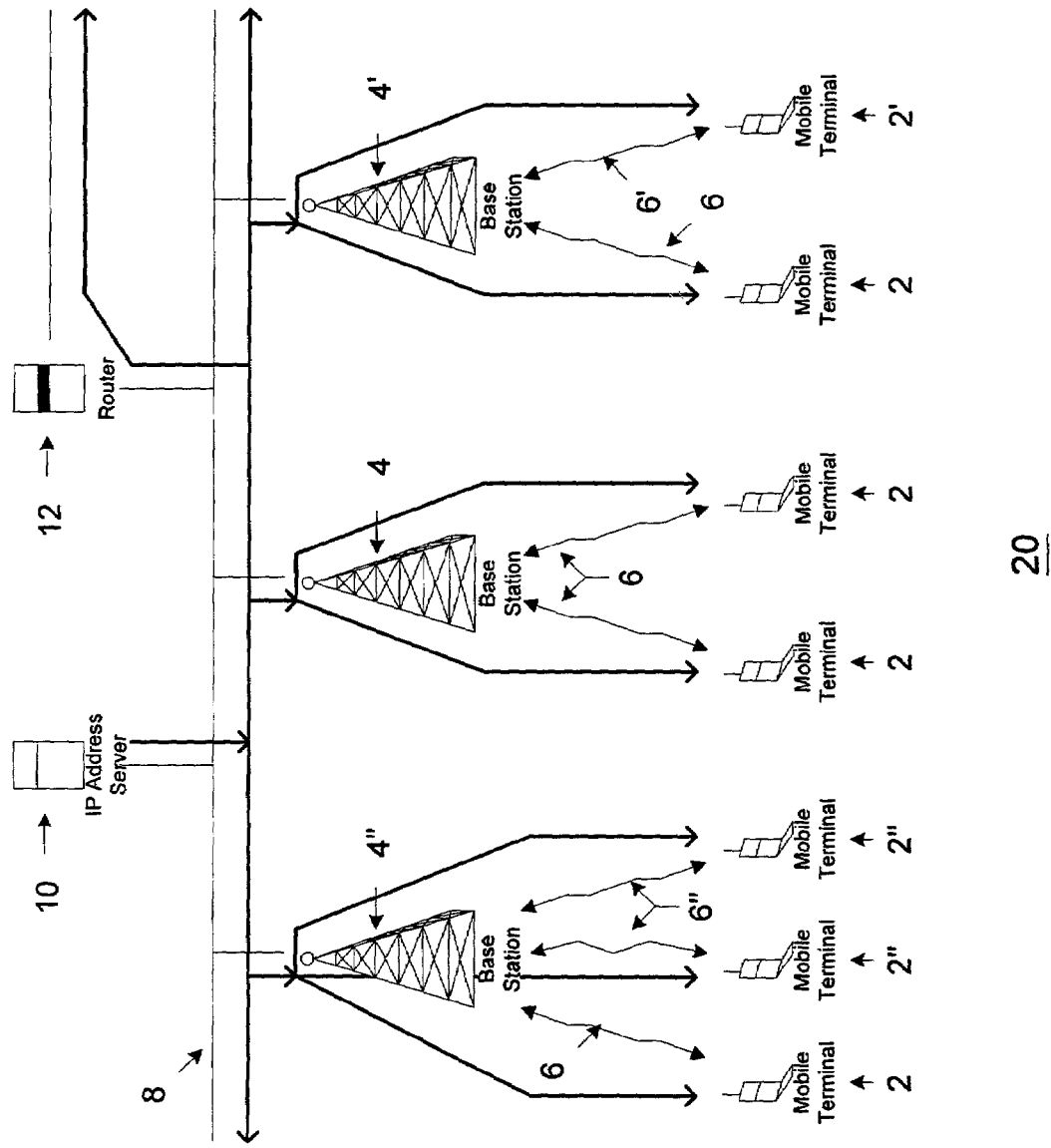
FIG. 6 is a block diagram illustrating Server-to-Terminal Assignment and Validation Congestion for a Wireless IP Network.

FIG. 6 is a diagram illustrating Server-to-Terminal Assignment and Validation Congestion for a Wireless IP Network. This is the network congestion caused by the broadcast of assignment and validation information by an IP address server back to a mobile terminal in response to the mobile terminal's assignment and validation requests, respectively. FIG. 6 thus assumes that an IP address server has received an assignment or validation request from a mobile terminal, has served the request by determining the new IP address or validation information, and is transmitting the assignment or validation information back to the mobile terminal by broadcasting the information to the mobile terminal.

As shown in FIG. 6, the IP address server 10 has received an assignment or verification request from mobile terminal 2' and now transmits the requested assignment or verification information back to the mobile terminal 2'. The IP address server 10 transmits the requested assignment or verification information by broadcasting the information to the mobile terminal 2'. Mobile terminals 2" are additional mobile terminals that have also requested assignment or validation information from an IP address server similar to mobile terminal 2'. However, the server-to-terminal response shown in FIG. 6 is the response of the IP address server 10 to the request of mobile terminal 2', rather than to mobile terminals 2".

Unlike mobile terminals 2' and 2", the IP address of the IP address server 10 is known to the base stations 4, 4' and 4"; thus, while the destination IP address of the information broadcast by the IP address server 10 to the mobile terminal 2' remains the broadcast address, the source IP address of the assignment or validation information broadcast by the IP address server 10 be the proper IP address of the IP address server 10. In this way, base stations 4, 4' and 4" as well as other network devices distinguish between the terminal-to-server assignment and verification requests transmitted by mobile terminal 2' to the IP address server 10 and the server-to-terminal assignment and verification information transmitted by the IP address server 10 back to the mobile terminal 2'.

When the IP address server 10 broadcasts the assignment or verification information back to the mobile terminal 2', the information is first broadcast to all the wired network devices including the router 12 and the base stations 4, 4' and 4". The base stations 4, 4' and 4" in turn broadcast the information to all the mobile terminals 2, 2' and 2". Thus, because there is no blocking in place, every mobile terminal 2, 2' and 2" receives the information broadcast by the IP address server 10 even though the information is only intended for the mobile terminal 2'.

Figure 7A:
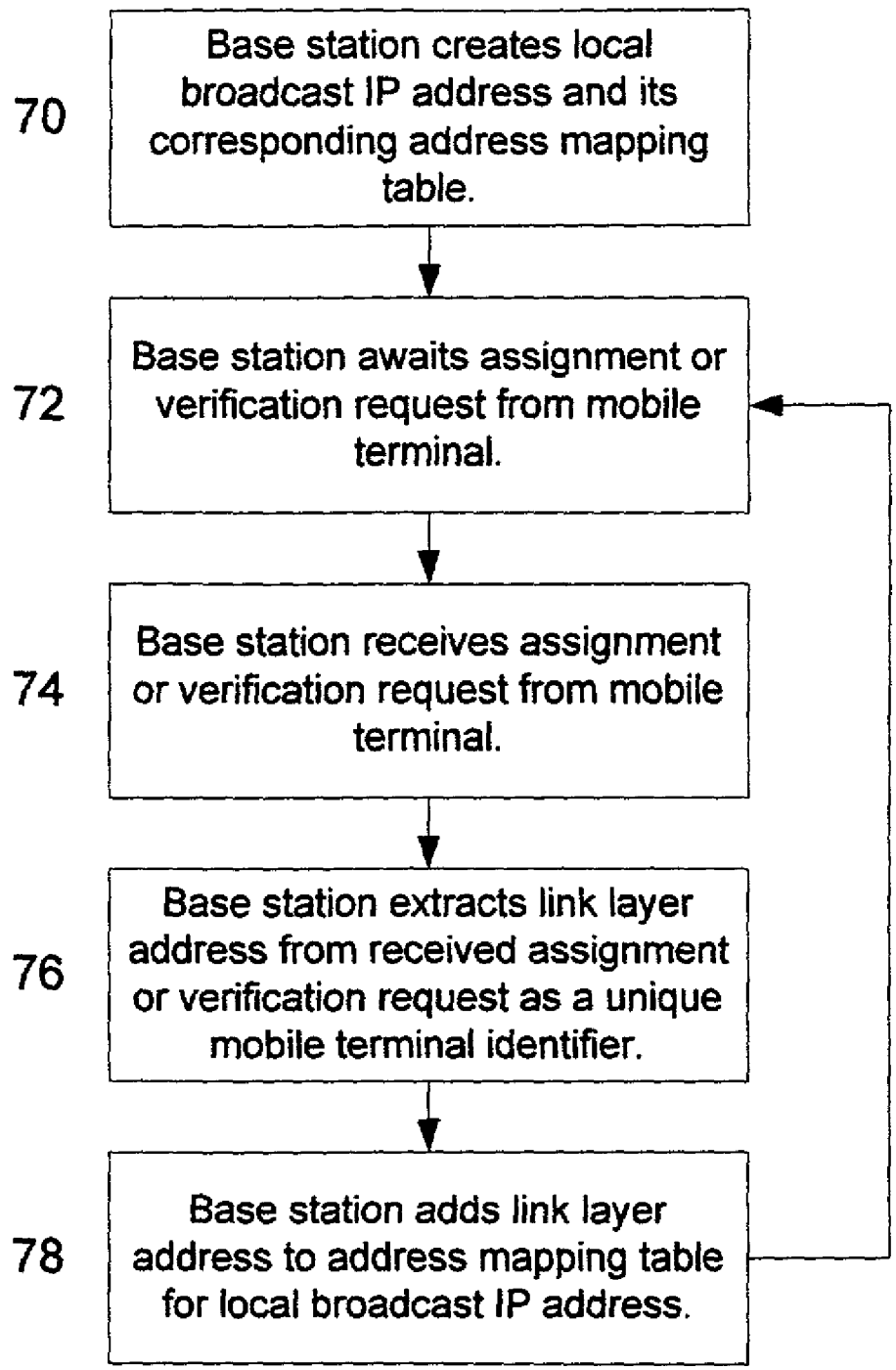
FIG. 7*a* is a flowchart of the Server-to-Terminal Blocking Mobile Terminal Addition process.
Figure 7B:
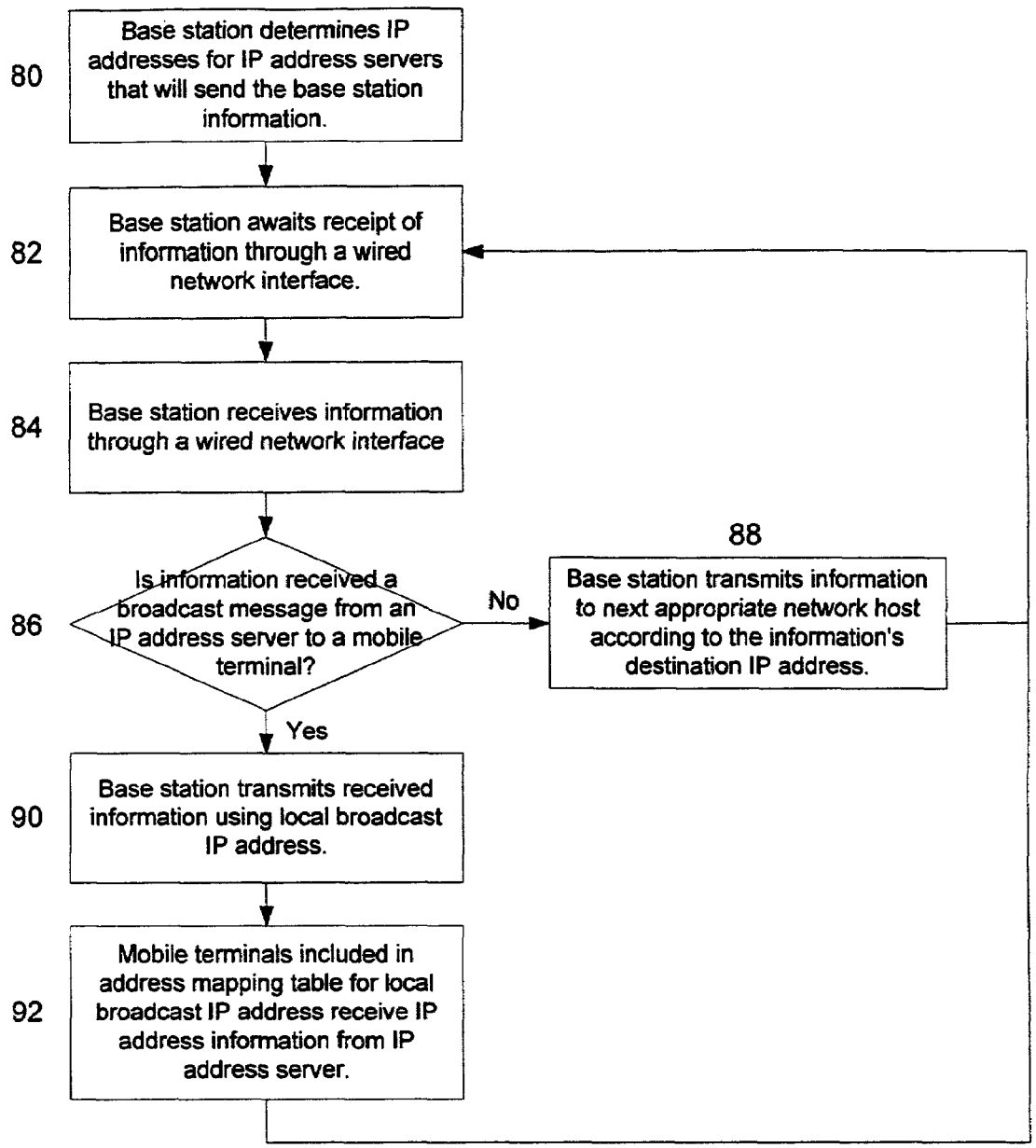
FIG. 7*b* is a flowchart of the Server-to-Terminal Blocking Local Broadcast process.
Figure 7C:
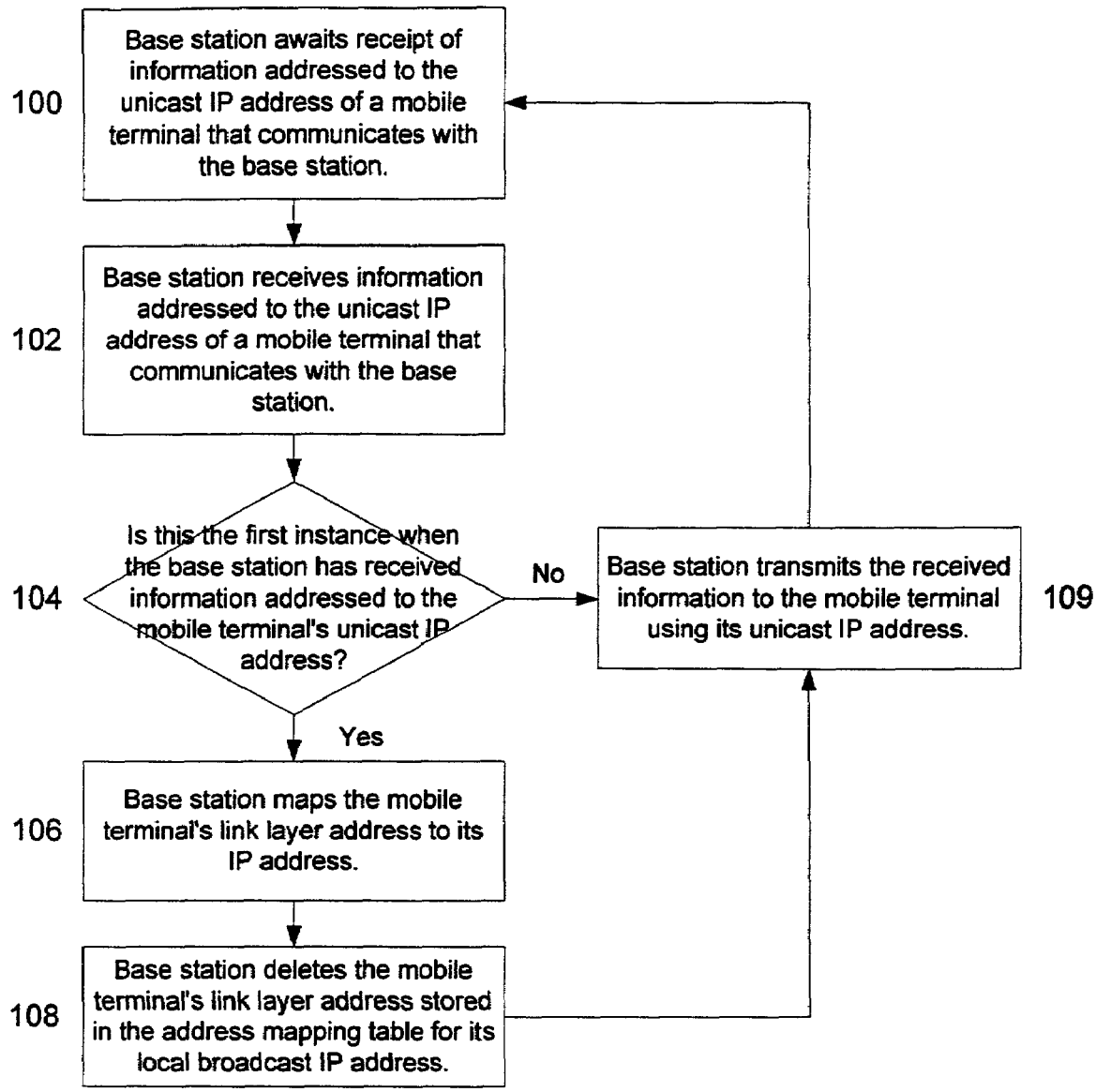
FIG. 7*c* is a flowchart of the Server-to-Terminal Blocking Mobile Terminal Removal process.

FIGS. 7a, 7b and 7c are flowcharts that show the Server-to-Terminal Blocking process, wherein the server-to-terminal congestion shown in FIG. 6 is eliminated according to the present invention. The Server-to-Terminal Blocking process is implemented in each base station within the wireless IP network, and thus the base stations selectively block assignment and validation information that originates at an IP address server and is intended for receipt by a mobile terminal.

Each base station implements the Server-to-Terminal Blocking process by creating a local broadcast IP address that includes only those mobile terminals that send assignment or validation requests to the base station. When the base station receives return assignment and validation information from an IP address server, the base station broadcasts that information using its local broadcast IP address. Thus, a base station broadcasts assignment and validation information from IP address servers to only those mobile terminals that have requested assignment and validation information, thereby blocking transmission of assignment and validation information to mobile terminals that have not requested assignment or validation information.

The Server-to-Terminal Blocking process includes three processes that run in parallel, and these parallel processes are shown in FIGS. 7a, 7b and 7c, respectively. The first process shown in FIG. 7a is the Server-to-Terminal Blocking Mobile Terminal Addition process, wherein a base station adds a mobile terminal to the address mapping table for its local broadcast IP address. The second process shown in FIG. 7b is the Server-to-Terminal Blocking Local Broadcast process, wherein the base station broadcasts assignment and validation information from IP address servers to mobile terminals using the local broadcast IP address for that base station, thereby blocking the transmission of this information to mobile terminals that have not requested assignment or validation information. The third process shown in FIG. 7c is the Server-to-Terminal Blocking Mobile Terminal Removal process, wherein a base station removes a mobile terminal from the address mapping table for the local broadcast IP address once the mobile terminal has received its valid unicast IP address from an IP address server.

FIG. 7a is a flowchart of the Server-to-Mobile Blocking Mobile Terminal Addition process, wherein a base station adds a mobile terminal to the local address mapping table when the base station receives an assignment or validation request from the mobile terminal, thereby including the mobile terminal as a recipient of messages broadcast using the local broadcast IP address. This process occurs in each base station, and thus each base station includes its own local broadcast IP address and address mapping table to broadcast information to mobile terminals that request assignment or validation information.

As shown in FIG. 7a, the base station first creates a local broadcast IP address and its corresponding address mapping table that are used to transmit assignment and validation information from IP address servers to mobile terminals (step 70). The local broadcast IP address is used to transmit assignment and validation information to only those mobile terminals that have requested assignment and validation information, and the address mapping tracks which mobile terminals have requested assignment or validation information and should thereby receive assignment and validation information broadcast by IP address servers.

After creating a local broadcast IP address and determining the IP addresses for the IP address servers, the base station then waits to receive an assignment or verification request from a mobile terminal (step 72). Upon receiving an assignment or verification request (step 74), the base station extracts a link layer address (layer 2) from the assignment or verification request that uniquely identifies the mobile terminal that sent the request, and thereby acts as a unique identifier for the requesting mobile terminal (step 76). Examples of possible link layer addresses include Medium Access Control addresses (MAC addresses), Electronic Serial Numbers (ESN), and International Mobile Equipment Identifiers (IMEI). The link layer address is then added to the address mapping table for the local broadcast IP address (step 78), thereby including the mobile terminal as a recipient of future broadcast information sent by an IP address server to mobile terminals. The process then returns to step 72, wherein the base station waits to receive a new assignment or verification request from a mobile terminal.

FIG. 7b is a flowchart of the Server-to-Terminal Blocking Local Broadcast process, wherein a base station transmits assignment or validation information from IP address servers to mobile terminals by broadcasting the information to the mobile terminals using the local broadcast IP address. Those mobile terminals included as recipients of the information broadcast using the local broadcast IP address are those mobile terminals included in the address mapping table for the local broadcast IP address. In turn, the mobile terminals included in the address mapping table are those mobile terminals awaiting assignment or validation information and are included in the address mapping table according to the Server-to-Terminal Blocking Mobile Terminal Addition process shown in FIG. 7a and described above. Thus, the Server-to-Terminal Blocking Local Broadcast process of FIG. 7b transmits assignment and validation information broadcast by IP address servers only to those mobile terminals currently awaiting assignment or validation information.

Referring now to FIG. 7b, the base station first determines the IP addresses for those IP address servers from which it will receive assignment or validation information (step 80). The base station can determine these IP addresses by being configured with the IP addresses of the IP address servers, or by dynamically requesting a new IP address for itself and then storing the source IP address of the assignment information returned by an IP address server, as the source IP address will be that of the IP address server.

After determining the IP addresses for IP address servers that will send the base station information, the base station awaits receipt of information through one of its wired interfaces (step 82). Upon receipt of information (step 84), the base station then determines if the information is a broadcast message from an IP address server to a mobile terminal by comparing the source IP address of the information to the IP addresses for the IP address servers determined at step 80, and by comparing the destination address to the broadcast address for mobile terminals (step 86). Thus, the base station determines if the information it received is a broadcast message from an IP address server to a mobile terminal.

If the information is not a broadcast message from an IP address server to a mobile terminal, then the process proceeds to step 88. At step 88, the base station transmits the message to the next appropriate network host according to the destination IP address of the information. The process then returns to step 82, and the base station awaits the receipt of additional information from the wired network.

Returning to step 86, if the received information is determined to be a broadcast message from an IP address server to a mobile terminal, then the process proceeds to step 90. At step 90, the base station simply transmits the broadcast message using its local broadcast IP address. The broadcast message is thereby transmitted only to those mobile terminals that are awaiting assignment or validation information from an IP address server, rather than to every mobile terminal connected to the wireless IP network. The mobile terminals included in the address mapping table receive the transmission of the assignment or validation information from the base station using the local broadcast IP address (step 92), thereby completing transmission of the assignment or validation information from the IP address server. Mobile terminals that are not awaiting reception of assignment or validation information are not included in the address mapping table for the local broadcast IP address, and thus these mobile terminals are blocked from receiving the assignment or validation information broadcast by the IP address server.

FIG. 7c is a flowchart of the Server-to-Terminal Blocking Mobile Terminal Removal process, wherein a base station removes a mobile terminal from the address mapping table for the base station's local broadcast IP address after the mobile terminal has received its valid unicast IP address for the mobile terminal's current IP subnet. Once a mobile terminal receives its valid IP address by receiving assignment and/or validation information from an IP address server, the mobile terminal uses its own IP address to unicast messages to appropriate recipients. In addition, the mobile terminal is no longer awaiting assignment or validation information from an IP address server. Thus, upon receipt of an IP address or validation of a prior IP address by an IP address server, the mobile terminal is removed from the address mapping table so that it will no longer receive assignment or validation information from IP address servers.

Turning to FIG. 7c, the base station first awaits receipt of information from a network host whose destination IP address is the unicast IP address of a mobile terminal communicating with the base station (step 100). Upon receipt of information addressed to a mobile terminal communicating with the base station (step 102), the base station then determines if this is the first instance when it has received information that is addressed to the unicast IP address of the mobile terminal (step 104). If not, then the mobile terminal merely transmits the information to the mobile terminal (step 109) and awaits the receipt of further information (step 100), because the base station has already sent information to the mobile terminal before via the mobile terminal's own IP address that has been assigned or verified by an IP address server.

If this is the first instance wherein the base station has received information that is addressed to the IP address of the mobile terminal, then the base station knows that the IP address of the mobile terminal has now been assigned or verified by an IP address server. In addition, the base station knows that the mobile terminal should be removed from the address mapping table for its local broadcast IP address, because the mobile terminal now has a valid IP address for the mobile terminal's present IP subnet, and therefore the mobile terminal no longer expects or should receive assignment or verification information from an IP address server. Thus, the process proceeds to step 106.

At step 106, the base station first maps the mobile terminal's link layer (layer 2) address to the mobile terminal's IP address (layer 3) as specified in the destination IP address of the information received by the base station. The mapping of the mobile terminal's layer 3 IP address to its layer 2 link layer address allows the base station to communicate subsequent information to the mobile terminal using its unicast IP address. It should be understood that this mapping does not occur in the address mapping table used for the local broadcast IP network, but instead is the traditional layer 2-layer 3 mapping that occurs for a base station to communicate with a mobile terminal using the mobile terminal's IP address.

The process then proceeds to step 108, wherein the base station deletes the mobile terminal's link layer address that was previously stored in the address mapping table in the Server-to-Terminal Blocking Mobile Terminal Addition process shown in FIG. 7*a* and described previously. By deleting the mobile terminal's link layer address from the address mapping table, the mobile terminal is removed from subsequent broadcasts by the base station using the local broadcast IP address; thus, the mobile terminal will no longer receive assignment and validation information from IP address servers, thereby blocking the mobile terminal from receipt of this unnecessary information. The base station transmits the information to the mobile terminal using its unicast IP address (step 109) and then awaits additional information to be transmitted to a mobile terminal (step 100).

Figure 8:
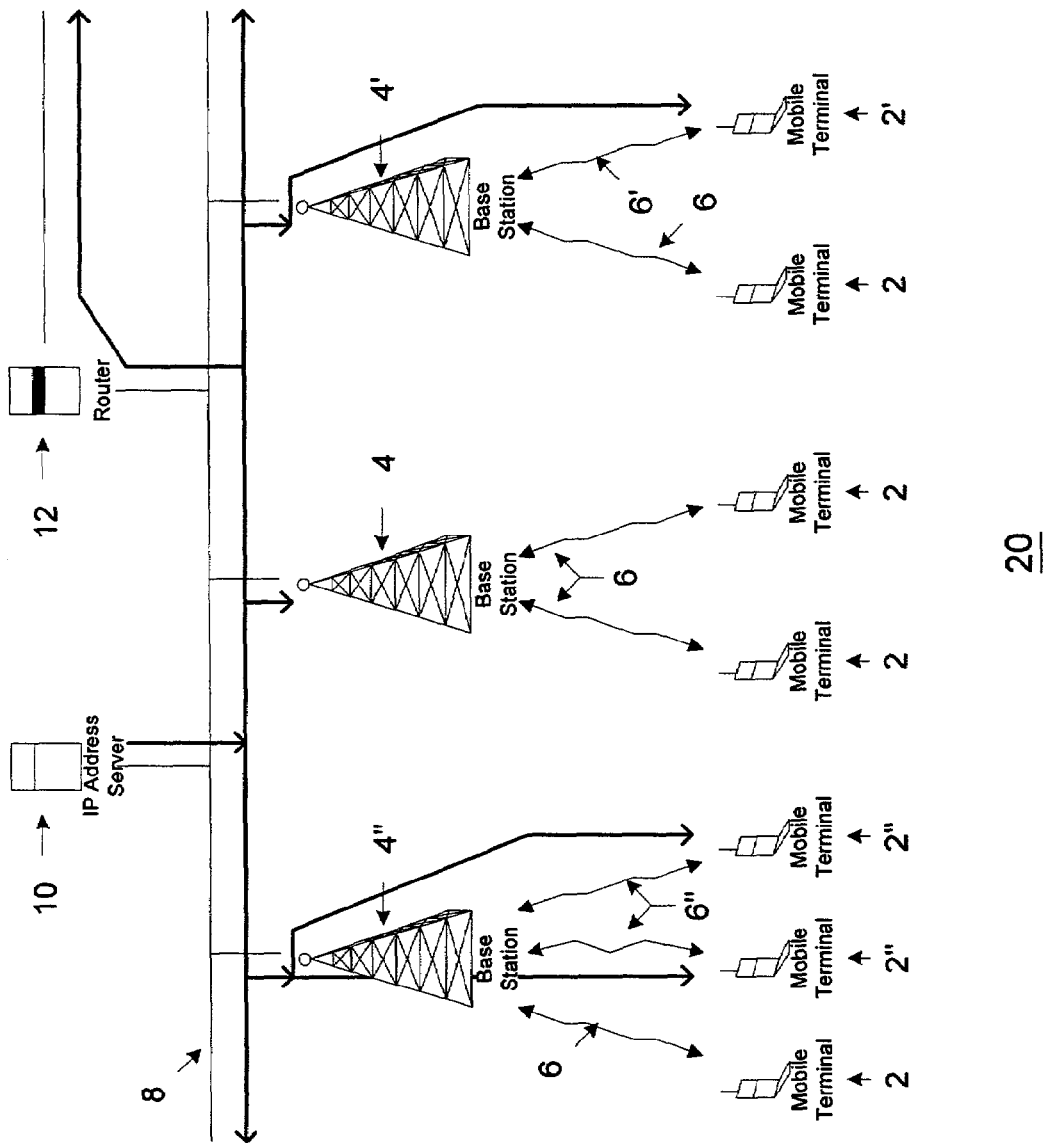
FIG. 8 is a block diagram illustrating a Wireless IP Network with Server-to-Terminal Blocking architecture.

FIG. 8 is a diagram illustrating a Wireless IP Network with Server-to-Terminal Blocking architecture. Each base station shown in FIG. 8 includes the Server-to-Terminal Blocking processes described in FIGS. 7*a*, 7*b* and 7*c* above, and thereby broadcasts assignment and validation information from IP address servers to mobile terminals using a local IP broadcast address.

As depicted in FIG. 8, the IP address server 10 is assumed to be serving an assignment or validation request from mobile terminal 2', and is thereby transmitting assignment or validation information back to mobile terminal 2' by broadcasting the information to the wireless IP network 20. The mobile terminals 2" are also assumed to have requested assignment or validation information from IP address server 10, but IP address server 10 has not yet responded to mobile terminals 2". Mobile terminals 2 have IP addresses that have already been assigned or validated by the IP address server 10, and thus mobile terminals 2 have not requested assignment or validation information.

When the IP address server 10 broadcasts assignment or validation information back to mobile terminal 2' as well as to the rest of the wireless IP network, the IP address server 10 first transmits the information to the router 12 and to the base stations 4, 4' and 4". The base stations 4, 4' and 4" know the IP address of the IP address server 10. Thus, upon receipt of the assignment or validation information from the IP address server 10, the base stations 4, 4' and 4" determine that the IP address server 10 is broadcasting assignment or validation information to a mobile terminal. Base stations 4, 4' and 4" thereby determine that they should transmit the information using their respective local broadcast IP addresses.

The address mapping table of base station 4 includes no mobile terminal link layer addresses because it is not currently communicating with any mobile terminals that have requested assignment or validation information. The address mapping table of base station 4' includes the link layer address of mobile terminal 2', because mobile terminal 2' transmitted its assignment or validation request to base station 4'; thus, base station 4' recorded the link layer address of mobile terminal 2' in its address mapping table at that time. The address mapping table of base station 4" includes the link layer address of mobile terminals 2" in a similar fashion, because the assignment or validation requests from mobile terminals 2" were transmitted to the wireless IP network 20 through base station 4".

Base stations 4, 4' and 4" transmit the assignment or validation information received from IP address server 10 to the mobile terminals 2' and 2" using their respective local broadcast IP addresses. These local broadcast IP addresses collectively include only mobile terminals 2' and 2" while excluding mobile terminals 2. Thus, the initial broadcast by IP address server 10 to the wired IP network 20, including all mobile terminals 2, 2' and 2", is blocked with respect to mobile terminals 2, which are not awaiting assignment or validation information from the IP address server 10 or any other IP address server. Instead, the assignment or validation information from IP address server 10 is transmitted only to mobile terminals 2' and 2", thereby reducing the server-to-terminal congestion otherwise caused when the IP address server 10 initially broadcasts assignment and verification information to the entire wireless IP network 20 including mobile terminals 2.

Figure 9:
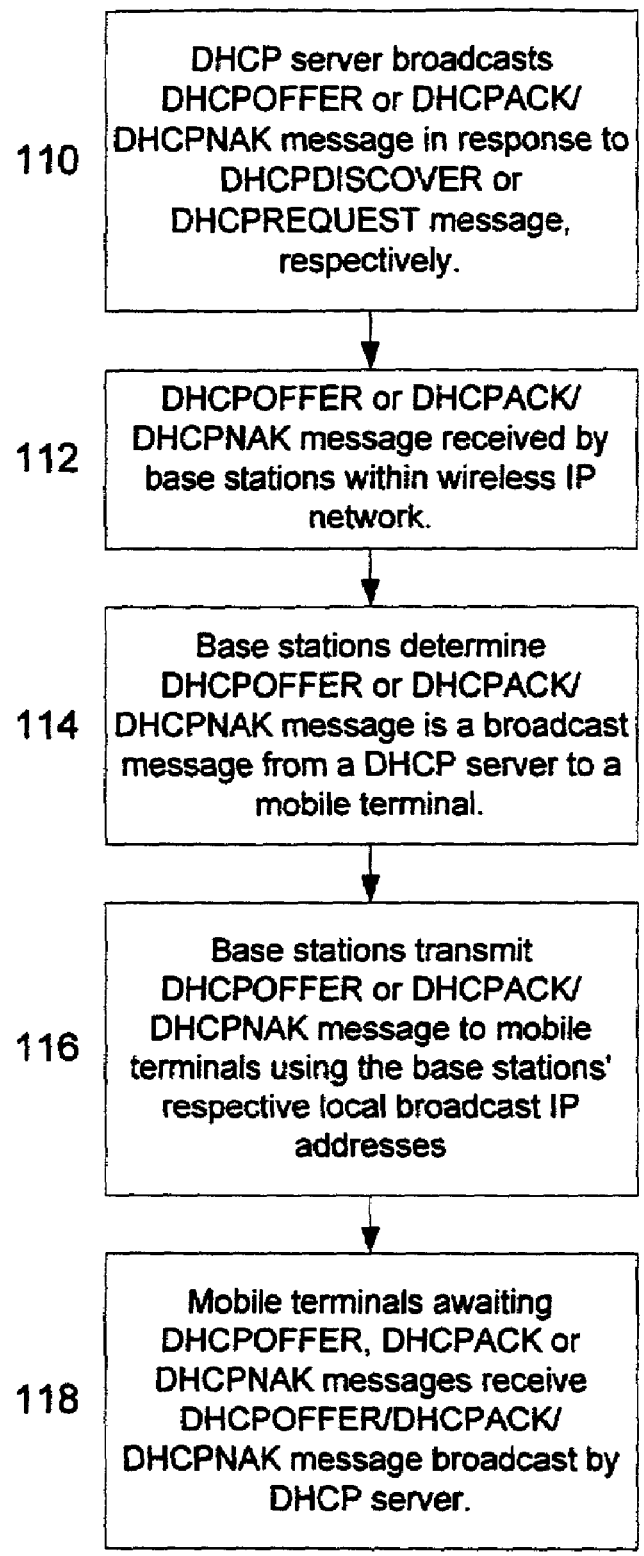
FIG. 9 is a flowchart of the DHCP Server-to-Terminal Blocking process.

FIG. 9 is a flowchart of the DHCP Server-to-Terminal Blocking process, wherein the Server-to-Terminal blocking process described above and depicted in FIGS. 7*a*, 7*b* and 7*c* is implemented with DHCP as the dynamic IP address assignment protocol. As IP address servers, DHCP servers transmit server-to-terminal messages including DHCPOFFER, DHCPACK, and DHCPNAK messages. A DHCPOFFER message is sent by a DHCP server in response to a DHCPDISCOVER message from a mobile terminal. The DHCPOFFER message offers an IP address and other configuration information to a mobile terminal in response to the DHCPDISCOVER message, i.e., assignment information sent to a mobile terminal in response to an assignment request.

DHCPACK and DHCPNAK messages are replies to a DHCPREQUEST message from a mobile terminal, wherein the mobile terminal requests validation of a prior IP address for the current subnet. Therefore, DHCPACK and DHCPNAK are validation information sent to a mobile terminal in response to a validation request. DHCPACK acknowledges that the prior IP address of the mobile terminal is valid, thereby allowing continued use of that IP address in the new subnet, whereas DHCPNAK notifies the mobile terminal that the prior IP address of the mobile terminal is not valid, and therefore should not be used in the new subnet.

For wide area networks (e.g., cdma2000 or W-CDMA), it is generally impossible for a DHCP server to unicast DHCP messages, including DHCPOFFER, DHCPACK and DHCPNAK messages, to a mobile terminal. Mobile terminals and DHCP servers in wide area networks often use incompatible layer 2 protocols (e.g., mobile terminal on cdma2000 network and DHCP server on wired Ethernet). Consequently, a DHCP server cannot use a mobile terminal's link layer address that is received with an assignment or verification request to transmit messages back to the mobile terminal as is sometimes possible for a local area network. Therefore, all DHCP messages including DHCPOFFER, DHCPACK and DHCPNAK messages must be broadcast throughout the wide area network.

Referring to FIG. 9, it is assumed that each base station has already determined the IP address for any DHCP server that will send the base station assignment and configuration information. Thus, each base station is able to identify messages sent by a DHCP server that is received by a base station.

It is also assumed that the mobile terminal has already transmitted an assignment or validation request using DHCP protocol that has been received by a DHCP server as described in the DHCP Protocol Terminal-to-Server Blocking process of FIG. 5. Thus, the mobile terminal has already transmitted a DHCPDISCOVER or DHCPREQUEST message that has been received by a DHCP server according to the process described in FIG. 5. In addition, it is assumed that the link layer address of the mobile terminal has been added to the address mapping table of the local broadcast IP address for the base station that received the DHCPDISCOVER or DHCPREQEUST.

According to FIG. 9, the DHCP server that received the DHCPDISCOVER or DHCPREQUEST message from a mobile terminal first responds to the DHCPDISCOVER message by broadcasting a DHCPOFFER message that includes a new, valid IP address for the mobile terminal, and responds to a DHCPREQUEST message by broadcasting a DHCPACK or DHCPNAK message that validates or invalidates the mobile terminal's prior IP address (step 110). The broadcasted DHCPOFFER, DHCPACK or DHCPNAK message is broadcast to the wireless IP network including the base stations connected to the wireless IP network, which receive the broadcast message from the DHCP server (step 112). The base stations determine the information received is a broadcast message from a DHCP server by comparing the source IP address and destination IP address with the known addresses of DHCP address servers and the known broadcast address (step 114).

After determining that the information received is a DHCP broadcast message, each base station transmits the message to mobile terminals awaiting assignment or validation information from a DHCP server by broadcasting the message using the base station's own local broadcast IP address (step 116). The address mapping table for each local broadcast IP address includes only those mobile terminals that have previously requested assignment or validation information through a DHCPDISCOVER or DHCPREQUEST message. In contrast, the address mapping table excludes those mobile terminals that have received a unicast message from the base station using the mobile terminals' respective permanent IP addresses, and that thereby are not waiting for assignment or validation information from a DHCP server. Thus, only those mobile terminals awaiting a DHCPOFFER, DHCPACK or DHCPNAK message receive the message from the DHCP server (step 118).

Figure 10:
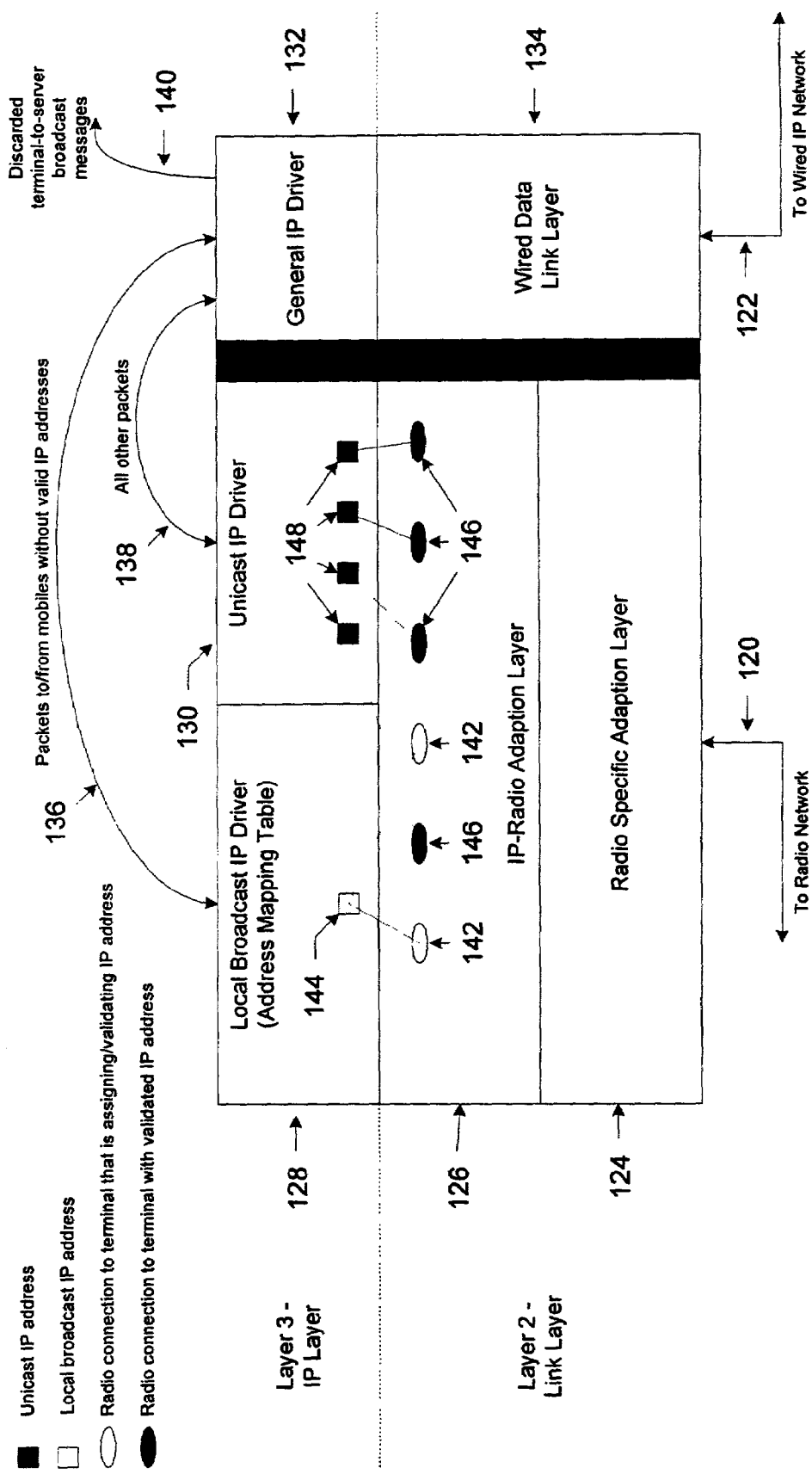
FIG. 10 is a block diagram illustrating a Base Station with Server-to-Terminal Blocking and Terminal-to-Server Blocking.

FIG. 10 is a diagram illustrating an illustrative embodiment of a base station 4 with Server-to-Terminal Blocking and Terminal-to-Server Blocking, wherein the Server-to-Terminal Blocking process of FIG. 3 and the Terminal-to-Server Blocking processes of FIGS. 7*a*, 7*b* and 7*c* are implemented in a single base station, in accordance with an aspect of this invention.

As illustrated by FIG. 10, the base station 4 includes a wireless interface 120 that connects to the radio network for communication with mobile terminals, as well as a wired interface 122 that connects to the wired IP network including IP address servers. The Radio Specific Adaption Layer 124 uses protocols such as RLP (Radio Link Protocol) to interface radio information with the IP-Radio adaption layer 126. The IP-Radio Information Layer 126 in turn interfaces link layer (layer 2) information with IP layer (layer 3) information, such as mapping link layer addresses including MAC addresses, ESNs and EMEIs to IP addresses for different mobile terminals.

The local broadcast IP driver 128 implements the address mapping table of the local broadcast IP address for the mobile terminal by binding the radio connections and link layer addresses of mobile terminals that have requested assignment or validation information 142 to the local broadcast IP address 144. In contrast, the unicast IP driver 130 implements the general binding of unicast IP addresses 148 that have already been assigned or verified for a mobile terminal to their corresponding individual radio connection and link layer address 146.

IP data packets are exchanged at the IP layer between the general IP driver 132 for the base station, and the local broadcast IP driver 128 and unicast IP driver 130. Data packets that have assignment or validation information, including responses by IP address servers, are exchanged between the local broadcast IP driver 128 and the general IP driver 132. All other non-assignment and non-validation information is exchanged between the unicast IP driver 130 and the general IP driver 132.

The general IP driver 132 receives information from the wired IP network through the wired interface 122, and is able to determine if an assignment or validation request has been received by the base station 4 through the wired interface by examining the IP header information of the information received through the wired interface 122. Thus, if the general IP driver 132 receives a terminal-to-server broadcast message through the wired interface 122, then the general IP driver 132 discards the terminal-to-server broadcast message 140 to block the unnecessary transmission of assignment and validation requests to mobile terminals.

The present invention includes the ability to automatically cause a mobile terminal to request or validate an IP address upon entering another subnet of an IP network. Specifically, a mobility daemon implemented in a mobile terminal forces the mobile terminal to validate its former IP address when entering a new subnet, and to request a new IP address if its former IP address is invalid. Often, a mobile terminal will not know for sure whether it has entered a new subnet prior to validating their existing IP address. When the mobile terminal changes from one base station to another, the radio system on the mobile terminal will know that it has moved from one base station to another and may inform the IP layer of this change. In accordance with the invention, this can be used to indicate that the mobile terminal may have changed subnets. To know whether the mobile terminal has changed subnets for sure, the mobile terminal will need to validate its current IP address. Furthermore, when certain mobility management protocols are used, such as Mobile IP, the mobile terminal may receive IP-layer information broadcast from the network to the mobiles, which can then use the information to determine whether a change of the IP subnets has occurred.

Figure 11:
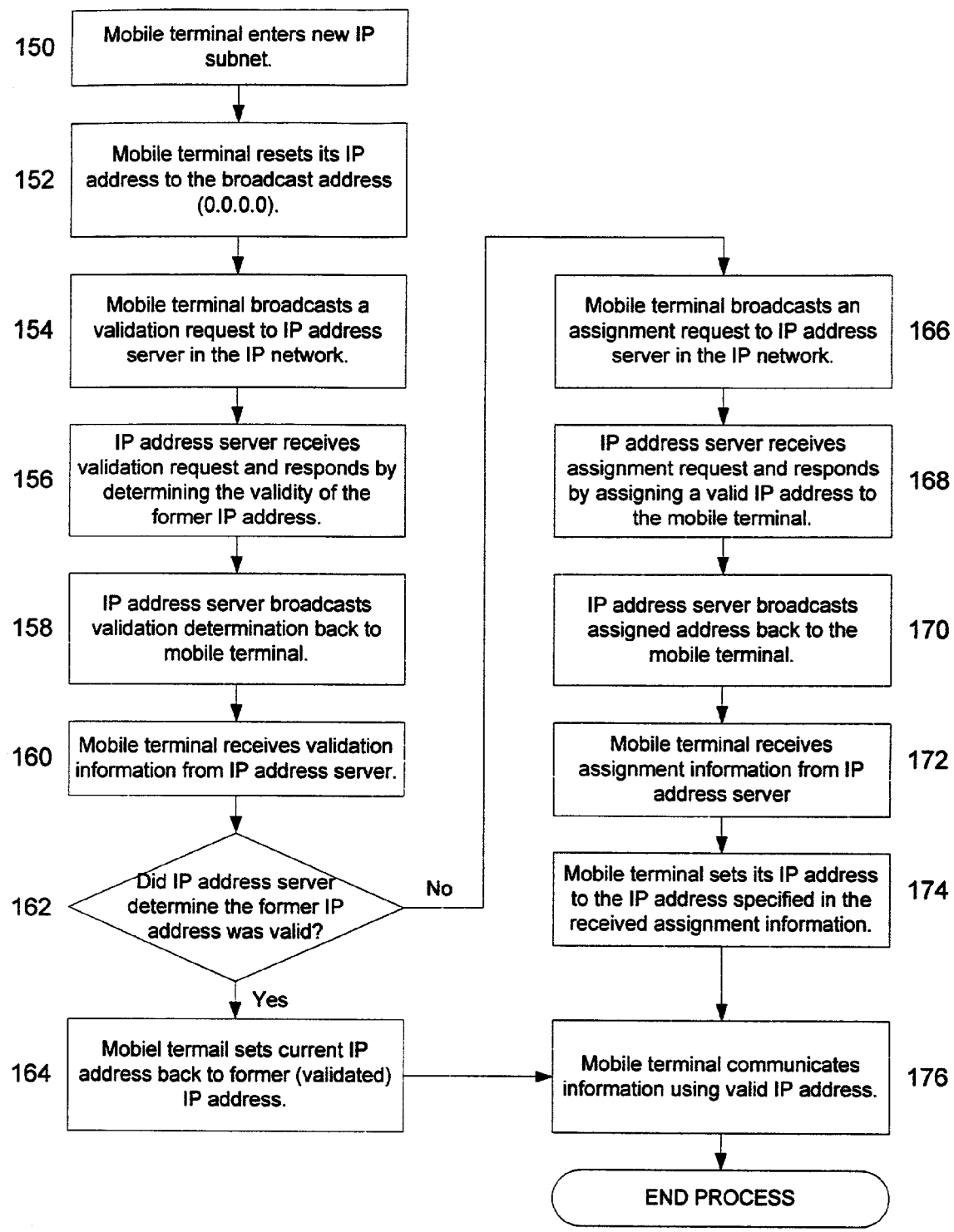
FIG. 11 is a flowchart of the Mobility Daemon process.

FIG. 11 is a flowchart of the Mobility Daemon process that sets the mobile terminal into a broadcast mode, forces the mobile terminal to validate its former IP address and, if necessary, forces the mobile terminal to request a new IP address. As mentioned previously, although embodiments of the present invention include a mobility daemon in addition to terminal-to-server and/or server-to-terminal blocking, implementation of the mobility daemon with terminal-toserver or server-to-terminal blocking is not required. Thus, the mobility daemon is itself independent of terminal-to-server and server-to-terminal blocking and may be implemented independent of either terminal-to-server or server-to-terminal blocking.

Turning to FIG. 11, a mobile terminal first enters a new subnet of an IP network (step 150), such as when a mobile terminal migrates from one subnet to another in a wireless IP network. Upon entering the new subnet, the mobile terminal temporarily resets its IP address to the null address, because the IP address that was valid in the former IP subnet could now be invalid (step 152). Thus, the IP address of the mobile terminal from the prior IP subnet becomes the "former" IP address of the mobile terminal, whereas the null address becomes the "current" IP address of the mobile terminal for communicating with the wireless IP network. The mobile terminal will communicate with the wireless IP network using the null address until either the mobile terminal's prior IP address is validated for the new subnet, or until the mobile terminal is assigned a new IP address that is valid for the new subnet.

After having its IP address reset to the null address, the mobile terminal then broadcasts a validation request to the IP network to have its former IP address validated by an IP address server for the new subnet (step 154). The validation request is transmitted to an IP address server, and the IP address server responds by validating or invalidating the former IP address (step 156). The validation or invalidation by the IP address server is then transmitted back to the mobile terminal via broadcast to the mobile terminal (step 158), and the mobile terminal receives the validation determination from the IP address server (step 160). All IP devices, including IP-based mobiles, will accept any broadcast packets. Upper layer messages within such packets are passed to the appropriate upper layer processes on the mobile terminal. In accordance with the invention, DHCP messages are passed to the DHCP client application on a specific mobile terminal. The DHCP client uses the information within the DHCP messages to determine whether a particular message is intended for the specific mobile terminal.

The mobile terminal next processes the validation determination received from the IP address server to determine if the IP address server validated or invalidated its former IP address (step 162). If its former IP address was determined as valid by the IP address server, then the process proceeds to step 164, and the mobile terminal sets its current IP address from the null address back to its former IP address. The process then proceeds to step 176. If at step 162 its former IP address was determined not to be valid by the IP address server, then the process proceeds to step 166.

At step 166, the mobile terminal knows its former IP address is invalid in the new subnet, so the mobile terminal must request a new IP address for the new subnet. The mobile terminal then broadcasts an assignment request to an IP address server in the IP network to request a new IP address that is valid for the new subnet (step 166). An IP address server receives the assignment request and responds by assigning a new and valid IP address to the mobile terminal (step 168). The new and valid IP address from the IP address server is transmitted back to the mobile terminal via broadcast to the mobile terminal (step 170), and the mobile terminal receives the new and valid IP address (step 172). The mobile terminal sets its current IP address to the new and valid IP address assigned by the IP address server in place of the null address (step 174). The process then proceeds to step 176.

At step 176, the mobile terminal has either validated its former IP address from the prior subnet or been assigned a new IP address for the new subnet. Thus, the mobile terminal communicates with the IP network in its normal unicast mode by sending and receiving information using its unicast (validated or assigned) IP address instead of broadcasting messages to the wireless IP network (step 176). The mobile terminal will continue to unicast its messages until it enters a new subnet, at which point the process begins again at step 150.

It should be understood that instead of validating its former IP address when entering into a new subnet, a mobile terminal could instead be forced to request a new IP address every time it migrates to the new subnet. Thus, in one embodiment of the present invention, the mobility daemon may simply include the functionality to automatically request a new IP address for the mobile terminal every time it migrates to a new subnet. After reset of the mobile terminal's IP address to the null address of 0.0.0.0, the mobility daemon can avoid validating its former IP address from another subnet, and instead proceed directly to request a new IP address from the IP network. This embodiment could be implemented if, for instance, it was known that every IP address was valid only in its particular subnet and thereby always became invalid any time a mobile terminal migrated from one subnet to another.

Figure 12:
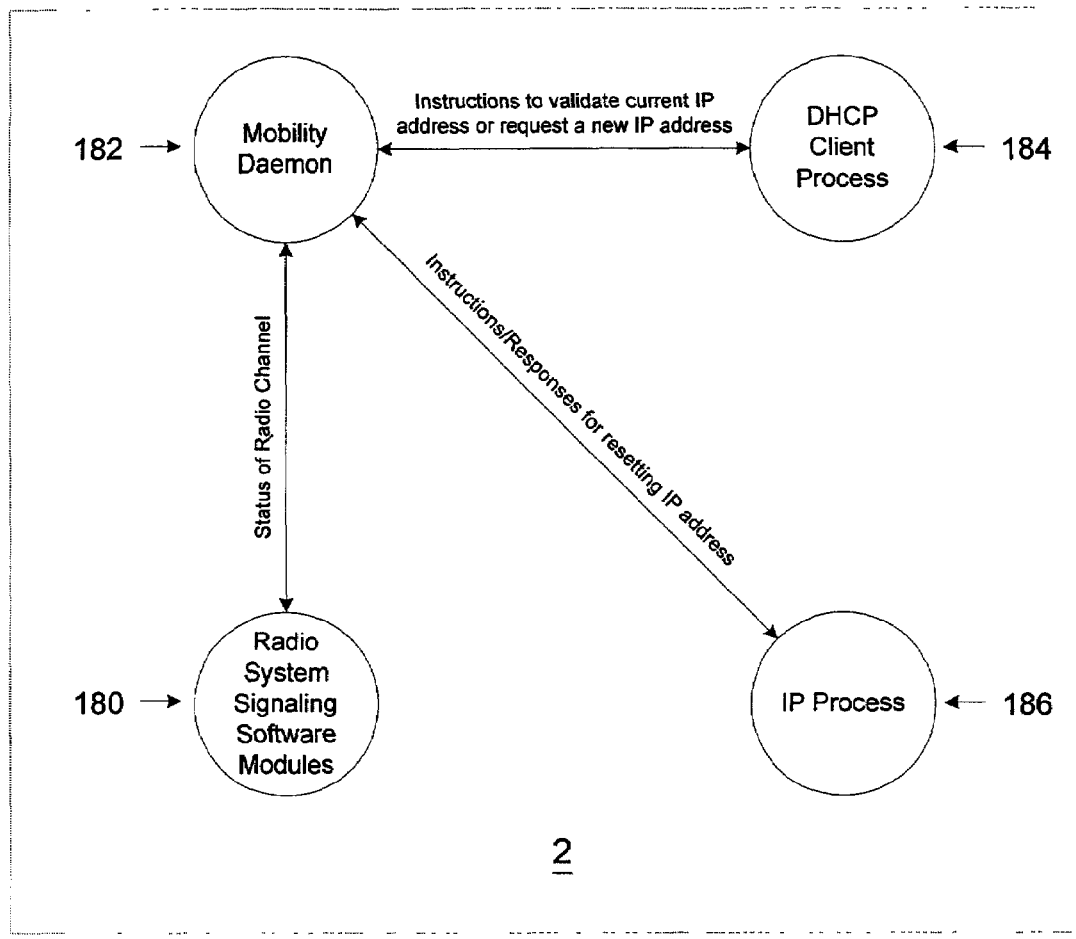
FIG. 12 is a diagram illustrating the Mobility Daemon as Implemented in a Wireless IP Network with DHCP.

FIG. 12 is a diagram illustrating the Mobility Daemon as implemented for a Wireless IP Network with DHCP, in accordance with this invention. As shown in FIG. 12, each mobile terminal 2 includes radio system signaling software modules 180, which control radio signaling between the mobile terminal 2 and base stations, IP process software 186 that controls the IP functions of the mobile terminal 2, and DHCP client process software 184 that controls DHCP client activities within the mobile terminal such as transmission and reception of DHCP messages. The mobility daemon 182 communicates with each of these modules to perform the Mobility Daemon process described in FIG. 11.

The radio system signaling software modules 180 notify the mobility daemon 182 when the mobile terminal is handed off from one wireless IP subnet to another. Once handoff has occurred, the link layer invokes the mobility daemon 182, and the mobility daemon 182 in turn signals the IP process to reset the IP address of the mobile terminal 2 from its present IP address, which may be invalid in the new subnet, to the null address of 0.0.0.0 for DHCP. Here, a software process in the link layer is used to monitor whether a link layer handoff has occurred. In the present invention, the software is a special link-layer daemon process.

The mobility daemon also signals the DHCP client process 184 and forces the DHCP client process 184 from the BOUND state, wherein the DHCP client 184 does not validate its present IP address or request a new IP address, to the RENEW state, wherein the DHCP client 184 seeks to validate the former IP address for the mobile terminal. Thus, the DHCP client 184 issues a DHCPREQUEST that is broadcast by the mobile terminal 2 to a DHCP server in the wireless IP network. The DHCP server receives the DHCPREQUEST and broadcasts a DHCPACK or DHCP-NAK message back to the mobile terminal 2, which is then forwarded to the DHCP client 184.

The DHCP client 184 processes the message received from the DHCP server to determine if the prior IP address is valid or invalid. If a DHCPACK message is received, then the prior IP address is valid and the DHCP client 184 notifies the mobility daemon 182, which in turn signals the IP process 186 to set the IP address of the mobile terminal 2 to the prior IP address. Thus, the mobile terminal 2 resumes communication of unicast messages between itself and the wireless IP network using its former (and now current) IP address. In addition, the DHCP client 184 transitions from the RENEW state back to the BOUND state because the mobile terminal 2 now has a valid IP address for the new subnet, and the mobility daemon 182 becomes inactive until invoked again when the mobile terminal 2 migrates into another subnet.

If a DHCPNAK is received, then the prior IP address is invalid and the DHCP client 184 is triggered by the mobility daemon 182 to change from the RENEW state to the INIT state. In the INIT state, the DHCP client 184 issues a DHCPDISCOVER message which is broadcast to a DHCP server in the wireless IP network in a manner similar to the preceding DHCPREQUEST message. The DHCP server responds to the DHCPREQUEST message by broadcasting a DHCPOFFER message back to the mobile terminal 2. The mobile terminal 2 receives the DHCPOFFER message which is forwarded to the DHCP client 184.

The DHCP client 184 processes the DHCPOFFER message, which includes a valid IP address for the mobile terminal 2. This IP address is forwarded to the mobility daemon 182, which instructs the IP process 186 to set the IP address of the mobile terminal 2 from the null address 0.0.0.0 to the valid IP address received in the DHCPOFFER message. Thus, the mobile terminal 2 resumes communication of unicast messages between itself and the wireless IP network using its new IP address assigned by the DHCP server. The DHCP client 184 transitions from the INIT state back to the BOUND state because the mobile terminal 2 now has a valid IP address for the new subnet, and the mobility daemon 182 becomes inactive until re-invoked upon entry of the mobile terminal 2 into another subnet.

While the invention has been particularly shown and described with reference to preferred embodiments thereof, it will be understood by those skilled in the art that various changes in form and details may be made therein without departing from the spirit and scope of the invention.

We claim:

1. A method for dynamic assignment and-validation of IP addresses in a wireless IP network, comprising the following steps:
   broadcasting IP messages from a mobile terminal to the wireless network;
   determining whether the IP messages are one of assignment request messages and validation request messages based on IP headers of the received IP messages;
   determining origination of the received request messages based on the IP address messages of the received request messages;
   selectively forwarding the received request messages to a server without transmitting the request messages to other mobile terminals which are actively communicating with base stations and to base stations which reside on a wired IP network based on the origination of the request messages; and
   triggering an IP address validation when the mobile terminal enters a new subset, said triggering step comprising initiating a mobility daemon when the mobile terminal enters the news subnet.

2. The method of claim 1, wherein said step of initiating the mobility daemon comprises the following steps:
   resetting an IP address of the mobile terminal to a null address,
   broadcasting a validation request message from the mobile terminal to an IP address server of the new subnet;
   determining whether a former IP address of the mobile terminal is valid in the IP address of the new subnet;
   transmitting a validation message for the former IP address at the mobile terminal; and
   setting the IP address of the mobile terminal from the null address to the former IP address if the former IP address is valid.

3. The method of claim 2, further comprising the following steps:
   requesting a new IP address which is valid for the new subnet;
   assigning a new, valid IP address to the mobile terminal based on the request for the new, valid IP address;
   transmitting the new, valid IP address to the mobile terminal; and
   setting the IP address of the mobile terminal to the new, valid IP address.

4. The method of claim 3, wherein said step of requesting a new IP address comprises broadcasting an assignment request message to an IP address server in the IP network.

5. The method of claim 1 further comprising resetting the mobile terminal's address to a null address whenever the mobile terminal enters a new subnet, said resetting being temporary until the mobile terminal validates a former IP address from a former subnet or is assigned a new and valid IP address for the new subnet.

6. The method of claim 5 further comprising the mobility daemon triggering the mobile terminal to broadcast a validation request to the new subnet to cause the new subnet to affirm or deny the validity of the mobile terminal's IP address from the former subnet.

7. The method of claim 5 further comprising, after the mobile terminal has secured a valid IP address, setting the mobile terminal's IP address from the null address to the valid IP address for the subnet.

8. A method for dynamic assignment and validation of IP address in a wireless network, comprising the following steps:
   broadcasting IP messages from a mobile terminal to a wireless interface;
   determining whether header information in one of the assignment request messages and validation request messages in received IP messages is a local broadcast IP address;
   determining whether the IP messages were received on one of the wireless interface and a wired interface if the header information indicates a broadcast IP address;
   if the header information indicates a broadcast IP address, then discarding the received IP messages, else broadcasting the received IP messages to the wired interface; and
   triggering an IP address validation when the mobile terminal enters a new subnet, said triggering step comprising initiating a mobility daemon when the mobile terminal enters the new subnet.

9. The method of claim 8, wherein said step of initiating the mobility daemon comprises the following steps:
   resetting an IP address of the mobile terminal to a null address;
   broadcasting a validation request message from the mobile terminal to an IP address server of the new subnet;

determining whether a former IP address of the mobile terminal is valid in the IP address server of the new subnet;

transmitting a validation message for the former IP address to the mobile terminal;

receiving the validation message for the former IP address at the mobile terminal;

determining whether the former IP address is valid based on the validation message of the former IP address received by the mobile terminal; and setting the IP address of the mobile terminal from the null address to the former IP address if the former IP address is valid.

10. The method of claim 9, further comprising the following steps:

requesting a new IP address which is valid for the new subnet;

assigning a new, valid IP address to the mobile terminal based on the request for the new, valid IP address;

transmitting the new, valid IP address to the mobile terminal; and setting the IP address of the mobile terminal to the new, valid IP address.

11. The method of claim 10, wherein said step of requesting a new IP address comprises the step of broadcasting an assignment request message to an address server in the IP network.

12. A method for dynamic assignment and validation of IP addresses in a wireless IP network, comprising the following steps:

adding a selected mobile terminal address to an address mapping table for a broadcast IP address when one of an assignment request and a validation request from the mobile terminal is received at a base station;

broadcasting at least one of assignment information and validation information from IP address servers to those mobile terminals included in the address mapping table; and removing a selected mobile terminal address from the address mapping table for the broadcast IP address once the selected mobile terminal has received a valid address from an IP address server.

13. The method of claim 12, wherein said adding step comprises the following steps:

creating a broadcast IP address and a corresponding mapping table for transmitting assignment and validation information from IP address servers only to mobile terminals which request the assignment and validation information and for tracking mobile terminals which request assignment and validation information;

awaiting receipt of one of an assignment and a verification request from the mobile terminal;

extracting a link layer address from one of the assignment request and verification request upon receipt of a request message which identifies the mobile terminal which requested the message;

adding the link layer address to the address mapping table for the corresponding broadcast IP address; and returning to the step of awaiting receipt of request messages.

14. The method of claim 12, further comprising the following steps:

identifying the mobile terminal which has requested one of the assignment information and verification information;

awaiting receipt of information via a wired interface;

comparing a source IP address of the received information to an IP address of the IP address server and comparing a destination address of the received information to a broadcast address to determine whether the received information is a broadcast message from a server; and if the received information is a broadcast message from a server, then transmitting the broadcast message, else forwarding the received information to a next appropriate network host based on the destination address of the received information.

15. The method of claim 12, further comprising the following steps:

awaiting receipt of information from a network host whose destination is a unicast IP address of the mobile terminal;

determining whether receipt of the information is a first instance of the unicast address addressed to the mobile terminal;

if receipt of the information is a first instance of the unicast IP address addressed to the mobile terminal, then removing the mobile terminal from the address mapping table;

mapping a link layer address of the mobile terminal to an IP address of the mobile terminal;

deleting a previously stored link layer address of the mobile terminal from the address mapping table;

forwarding the received information to the mobile terminal based on the unicast IP address of the mobile terminal; and awaiting receipt of additional information from the network host.

16. The method of claim 15, further comprising the following steps:

forwarding the received information to the mobile terminal if receipt of the information is not the first instance of the unicast IP address addressed to the mobile terminal; and awaiting receipt of additional information from the mobile host.

17. The method of claim 13, wherein the IP address server is a DHCP server.

18. The method of claim 17, wherein the DHCP server broadcasts one of DHCPOFFER messages, DHCPACK messages, and DCHPNACK messages in response to one of DHCPDISCOVER and DHCPREQUEST messages, respectively.

19. The method of claim 12, further comprising the step of triggering an IP address validation when the mobile terminal enters a new subnet.

20. The method of claim 19, wherein said triggering step comprises the step of initiating a mobility daemon when the mobile terminal enters the new subnet.

21. The method of claim 20, wherein said step of initiating the mobility daemon comprises the following steps:

resetting an IP address of the mobile terminal to a null address;

broadcasting a validation request message from the mobile terminal to an IP address server of the new subnet;

determining whether a former IP address of the mobile terminal is valid in the IP address server of the new subnet;

transmitting a validation message for the former IP address to the mobile terminal;

receiving the validation message for the former IP address at the mobile terminal;

determining whether the former IP address is valid based on the validation message for the former IP address received by the mobile terminal; and setting the IP address of the mobile terminal from the null address to the former IP address if the former IP address is valid.

22. The method of claim 20, further comprising the following steps:

requesting a new IP address which is valid for the new subnet;

assigning a new, valid IP address to the mobile terminal based on the request for the new, valid IP address;

transmitting the new, valid IP address to the mobile terminal; and setting the IP address of the mobile terminal to the new, valid IP address.

23. The method of claim 22, wherein said step of requesting a new IP address comprises the step of broadcasting an assignment request message to an IP address server in the IP network.

* * * * *

UNITED STATES PATENT AND TRADEMARK OFFICE
CERTIFICATE OF CORRECTION

PATENT NO. : 7,072,340 B2
APPLICATION NO. : 10/062593
DATED : July 4, 2006
INVENTOR(S) : Agrawal et al.

Page 1 of 2

It is certified that error appears in the above-identified patent and that said Letters Patent is hereby corrected as shown below:

In the Drawings

Fig. 3, Sheet 3 of 14, delete " 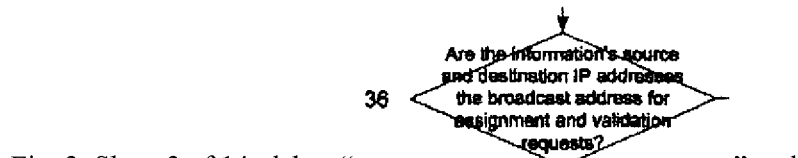 " and
insert -- 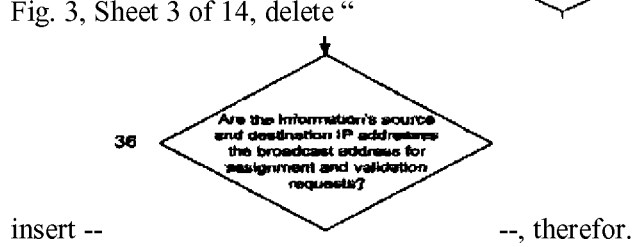 --, therefor.

Fig. 7b, Sheet 8 of 14, delete " 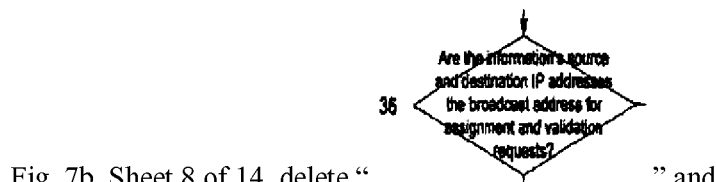 " and
insert -- 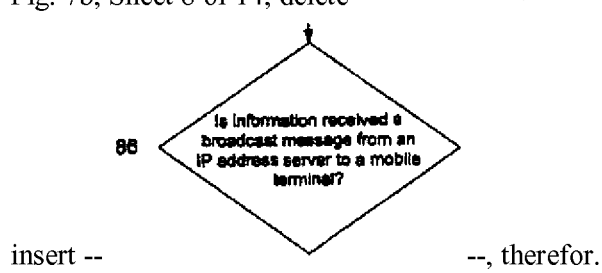 --, therefor.

Signed and Sealed this
Twenty-third Day of December, 2014

Michelle K. Lee
*Deputy Director of the United States Patent and Trademark Office*

Fig. 7c, Sheet 9 of 14, delete " 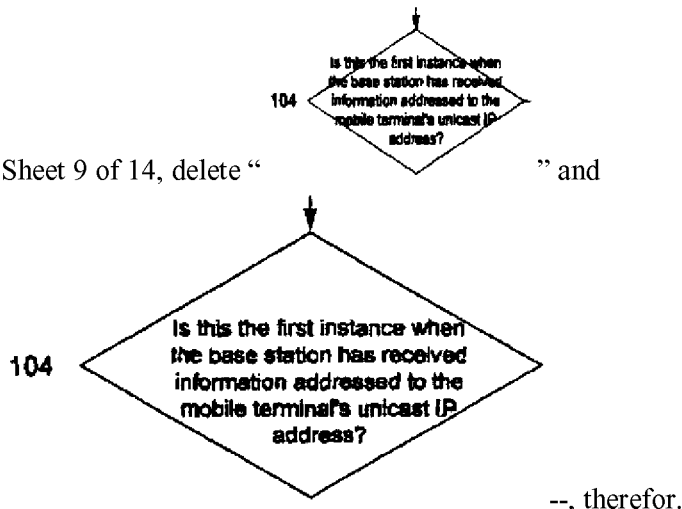 " and insert -- -- , therefor.
Fig. 11, Sheet 13 of 14, for Tag "164", in Line 1, delete "termail" and insert -- terminal --, therefor.
In the Specification
Column 12, Line 32, delete "to validation" and insert -- validation --, therefor.
Column 19, Line 50, delete "terminals'" and insert -- terminal's --, therefor.
Column 20, Line 6, delete "EMEIs" and insert -- IMEIs --, therefor.